US008210469B2

(12) United States Patent
Nitzsche et al.

(10) Patent No.: US 8,210,469 B2
(45) Date of Patent: Jul. 3, 2012

(54) HYBRID DEVICE FOR VIBRATION CONTROL

(76) Inventors: Fred Nitzsche, Ottawa (CA); Daniel Feszty, Kanata (CA)

( * ) Notice: Subject to any disclaimer, the term of this patent is extended or adjusted under 35 U.S.C. 154(b) by 637 days.

(21) Appl. No.: 12/430,432

(22) Filed: Apr. 27, 2009

(65) Prior Publication Data

US 2009/0321555 A1 Dec. 31, 2009

Related U.S. Application Data

(60) Provisional application No. 61/076,171, filed on Jun. 27, 2008.

(51) Int. Cl.
*B64C 27/51* (2006.01)
*B64C 27/57* (2006.01)
(52) U.S. Cl. ............... 244/17.13; 244/17.11; 244/17.23
(58) Field of Classification Search ............. 244/17.11, 244/17.13, 17.23
See application file for complete search history.

(56) References Cited

U.S. PATENT DOCUMENTS

| 5,973,440 | A * | 10/1999 | Nitzsche et al. | 310/326 |
| 6,135,713 | A * | 10/2000 | Domzalski et al. | 416/23 |
| 6,453,669 | B2 * | 9/2002 | Kennedy et al. | 60/527 |
| 2006/0049302 | A1 * | 3/2006 | Kennedy et al. | 244/17.11 |

OTHER PUBLICATIONS

Feszty, D., Nitzsche, F., Khomutov, K., Lynch, B., Mander, A., Ülker, F.D., "Design and instrumentation of the SHARCS scaled rotor with three independent control systems", Paper No. 080166, 64th Annual Forum of the American Helicopter Society, Apr. 29-May 1, 2008, Montreal, QC, Canada, 2008.
Mander, A., Feszty, D., Nitzsche, F., "Active Pitch Link Actuator for Impedance Control of Helicopter Vibration", Paper No. 080170, 64th Annual Forum of the American Helicopter Society Apr. 29-May 1, 2008, Montreal, QC, Canada, 2008.
Lynch, B., Nitzsche, F., Feszty, D., Cha, M., Gransden, D., Khomutov, K., Mander, A., Oxley, G., Ülker, F.D., "Development of a Smart Rotorcraft Blade for Noise and Vibration Attenuation", Canadian Aeronautics and Space Institute (CASI) AERO 2007 Conference, Toronto, Canada, Apr. 24-26, 2007.
Nitzsche, F., Feszty, D., Waechter, D., Bianchi, E., Voutsinas, S., Gennaretti, M., Coppotelli, G., Ghiringhelli, G.L., "The SHARCS Project: Smart Hybrid Active Rotor Control System for Noise and Vibration Attenuation of Helicopter Rotor Blades," paper No. 052, 31st European Rotorcraft Forum, Florence, Italy, Sep. 2005.
Ghorashi, M., Mikjaniec, T., Lynch, B., Ülker, F.D., Cha, M., Mandel., A., Brassard, D.P., Feszty, D., Nitzsche, F., "Preliminary Design of a Scaled Rotor Blade with Vibration and Noise Control Devices", Paper No. AR-08, 32nd European Rotorcraft Forum, Maastricht, the Netherlands, Sep. 2006.
Dieterich, O., "Application of modern control technology for advanced IBC systems", 24th European Rotorcraft Forum, Marseilles, France, 1998.

(Continued)

*Primary Examiner* — Jerome Jackson, Jr.
*Assistant Examiner* — David Spalla

(57) ABSTRACT

Disclosed herein are control systems relating generally to the field of aerodynamics and more particularly to the control of vibration of rotor blades such as helicopter blades. Such systems involve devices for vibration control of each rotor blade, which incorporate control systems of the flow control type (e.g. actively controlled flap) and structural control type (e.g. active pitch link). Also disclosed are related methods of controlling vibration in a rotor blade, wherein the rotor blade is coupled to a rotor hub and has at least a torsional stiffness and a pitch angle associated therewith.

15 Claims, 22 Drawing Sheets

OTHER PUBLICATIONS

Nitzsche, F., Lammering, R. and Breitbach, E., "Can Smart Materials Modify Blade Root Boundary Conditions to Attenuate Helicopter Vibration?", 4$^{th}$ International Conference on Adaptive Structures, Cologne, Germany, Nov. 2-4, 1993, E. Breitbach, B.K. Wada and M. Natori, Editors, Technomic, Lancaster, PA, 1994, pp. 139-150.

Nitzsche, F., Zimcik, D., Wickramasinghe, V., and Yong, C., "Control laws for an active tunable vibration absorber designed for aeroelastic damping augmentation," The Aeronautical Journal, vol. 108, No. 1079, 2004, pp. 35-42.

* cited by examiner

BEFORE　　　　　AFTER

DIRECTION OF FLIGHT

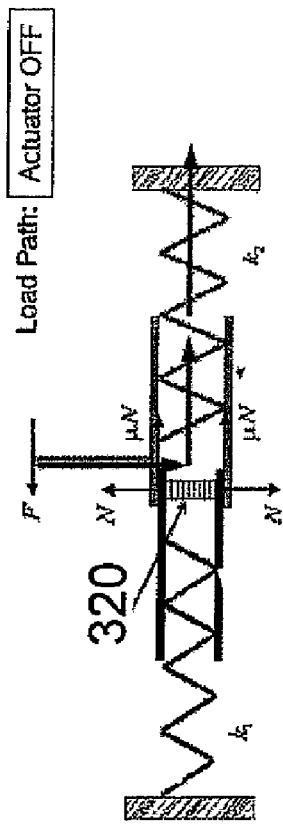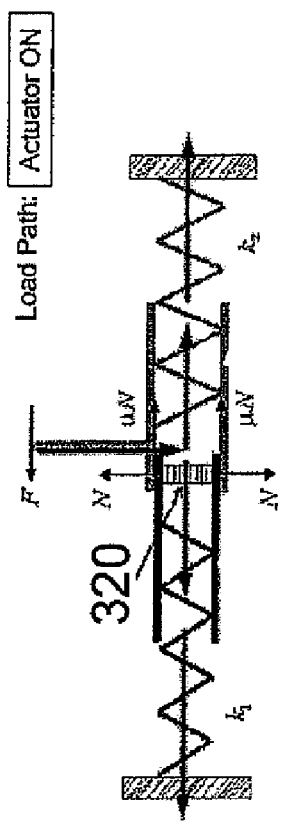
FIG. 3B (Prior Art)
FIG. 3C (Prior Art)

HIGH-LIFT DEVICE

AEROELASTIC SERVO-TAB

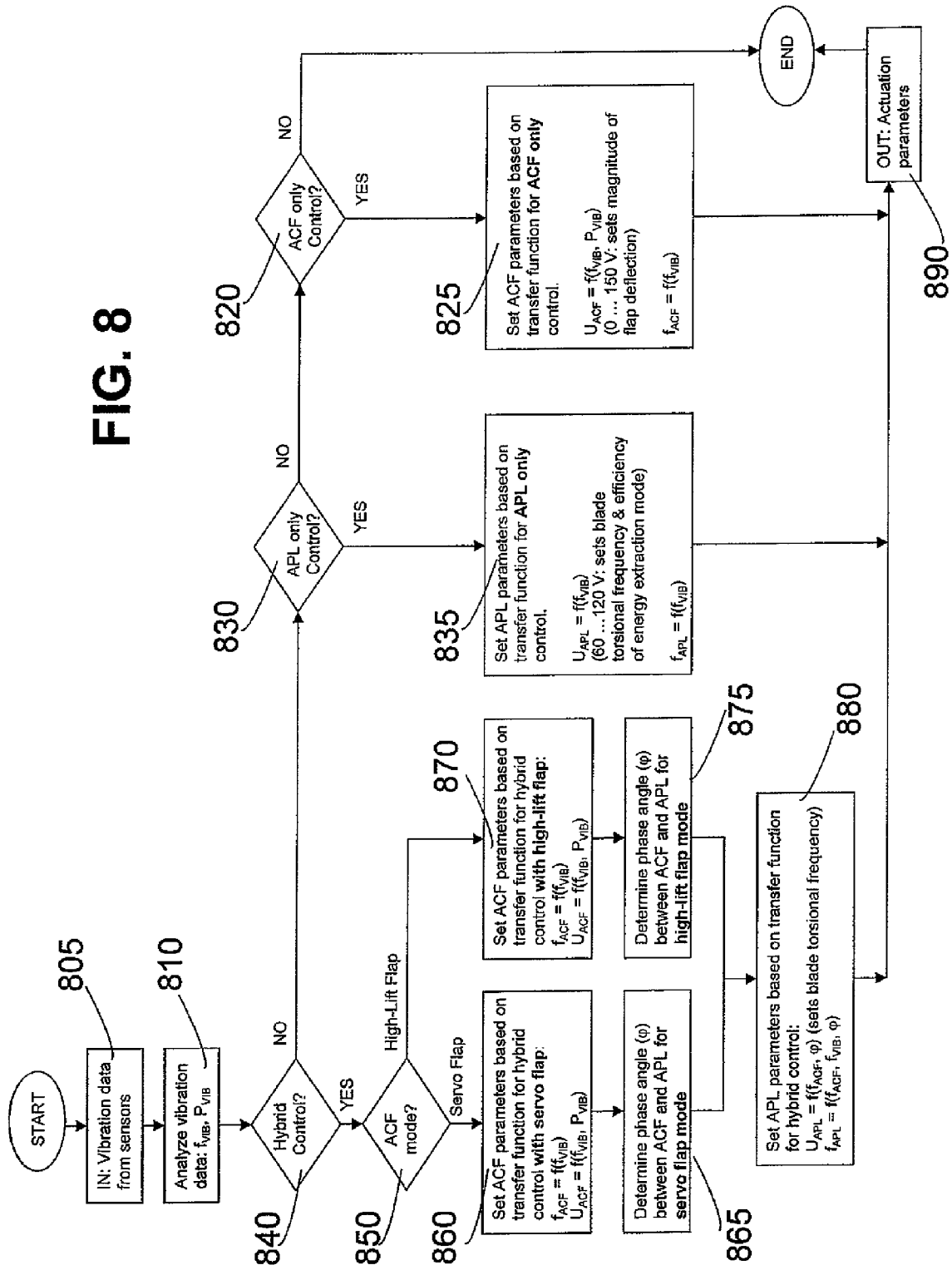

HYBRID DEVICE FOR VIBRATION CONTROL

CROSS-REFERENCE TO RELATED APPLICATION

This application claims the priority right of prior U.S. patent application Ser. No. 61/076,171 filed on Jun. 27, 2008 by applicants herein.

TECHNICAL FIELD

The invention relates generally to the field of aerodynamics and more particularly to a system and method for the control of vibration of helicopter rotor blades.

BACKGROUND TO THE INVENTION

As those skilled in the art are aware, both flow control and structural control devices can be employed on each rotating rotor blade of a helicopter to minimize vibration in flight. The most efficient method of reducing vibration on helicopter rotor blades is through Individual Blade Control (IBC) in which each rotor blade is individually controlled using a flow control or structural control device.

Structural control includes any devices capable of controlling the mass, stiffness or damping of the helicopter blade. The only practical structural control device developed to date is the Active Pitch Link, which is able to control the torsional stiffness characteristics of a blade.

Flow control can be defined as any control technique capable of controlling the aerodynamic loads acting on the blade. Such techniques include Actively Controlled Flap (ACF), Active Twist Rotor (ATR), Actively Controlled Tip (ACT), along with various types of Boundary Layer Suction/Blowing devices. For helicopters, the two most popular techniques have been the Actively Controlled Flap (ACF) and Active Twist Rotor (ATR).

There are a number of major research teams worldwide investigating the feasibility of various active control technologies on helicopter rotor blades. Of the research presently being performed, all research teams consider only one control system per blade. The most popular vibration control systems are of the flow control type with the most popular control system in this category being ACF because of the significantly lower power requirement than ATR. Some prior art systems have applied ACF with two independently controlled flaps on a single blade i.e. two independent control systems of the same type.

However, the problem with applying only one type of control device, especially actively controlled flap (ACF) or active twist rotor (ATR), is that these devices are not very efficient on their own. This is due to the fact that both of these technologies try to actively control the twist (or effective pitch angle) of the rotor blades. This is clearly the goal of a rotor blade employing ATR, but even with ACF it has been shown that a flap is much more efficient when used as a servo-tab than when used as a high-lift device. The goal of a servo-tab is to twist the rotor blade as a result of the flap deflection whereas the goal of the high-lift device is to increase the local rotor blade section lift of a rigid blade.

In order to impose the highest possible twist effect, either as a result of employing ACF or ATR technology, the rotor blade torsional stiffness should be as low as possible. However, the torsional stiffness of a helicopter rotor blade is set to a certain level to avoid excessive deformations due to the aerodynamic loads during operation. This level cannot be lowered by simply making softer blades; otherwise the blades would become too flexible and aeroelastic problems and loss of aerodynamic efficiency would occur.

Therefore, there is a need in the art for some kind of control system allowing the rotor blade torsional stiffness to be lowered whenever the flow control device is actuated.

SUMMARY OF THE INVENTION

Certain exemplary embodiments may provide a feedback control system for controlling vibration in a rotor blade, wherein the rotor blade is coupled to a rotor hub and has at least a torsional stiffness and a pitch angle associated therewith, the feedback control system comprising: a flow control device for adjusting the pitch angle of the rotor blade; a structural control device for adjusting the torsional stiffness of the rotor blade; a plurality of sensors attached to the rotor blade; and a control computer communicating with the flow control device, the structural control device and the plurality of sensors, wherein vibration data from the sensors is received by the control computer and control signals are generated by the control computer to reduce the torsional stiffness of the rotor blade with the structural control device and simultaneously increase the pitch angle of the rotor blade with the flow control device.

Certain other exemplary embodiments may provide a method of controlling vibration in a rotor blade, wherein the rotor blade is coupled to a rotor hub and has at least a torsional stiffness and a pitch angle associated therewith, the method comprising the steps of: receiving vibration data from a plurality of sensors into a control computer, wherein the control computer communicates with a flow control device, a structural control device and the plurality of sensors, wherein each of the flow control device, the structural control device and the plurality of sensors are electromechanically coupled to the rotor blade; generating control signals in the control computer; adjusting the structural control device to reduce the torsional stiffness of the rotor blade based on the control signals inputted therein; and simultaneously adjusting the flow control device to increase the pitch angle of the rotor blade based on the control signals inputted therein.

BRIEF DESCRIPTION OF THE DRAWINGS

The invention will now be described with reference to the drawings in which:

FIG. 3B depicts the smart spring of FIG. 3A with the actuator off;

FIG. 3C depicts the smart spring of FIG. 3A with the actuator on;

FIG. 8 depicts a flow chart detailing the control steps performed by the control computer of FIG. 7;

DESCRIPTION OF PREFERRED EMBODIMENTS (A) Hybrid Device—Overview

The present invention employs, at least in selected embodiment, the simultaneous application of any type of structural control and flow control device on each individual blade. For the purposes of describing the invention, a specific example of employing an Active Pitch Link (APL) for structural control and Actively Controlled Flap (ACF) for flow control will be presented. However, it should be appreciated, that the invention is not meant to be limited to this embodiment. The general principle of combining these two devices in a "hybrid system" can be extended to any other combination of structural and flow control devices.

Figure 1A:
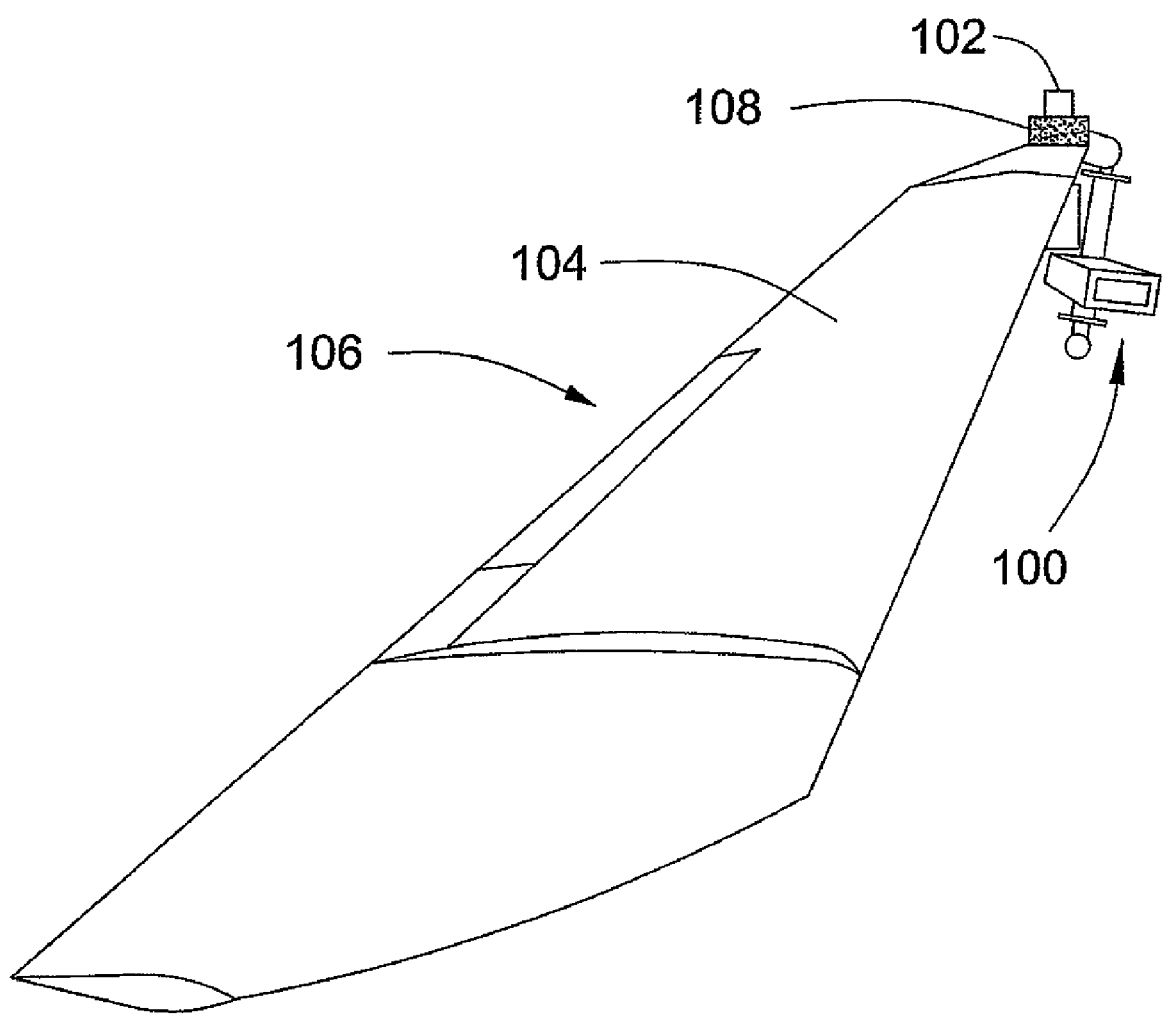
FIG. 1A depicts an overview of the rotor blade incorporating the hybrid vibration control device of the present invention.

Referring to FIG. 1A, the structural control is realized using an Active Pitch Link (APL) 100, which replaces the conventional pitch link on the rotor hub (102). APL 100 is capable of changing the torsional stiffness of the rotor blade 104.

The flow control is realized via an Actively Controlled Flap (ACF) 106, located at the trailing edge of rotor blade 104, closer towards the tip.

The frequency at which these two mechanisms operate is important. Both are able to actuate at the frequencies typical of Individual Blade Control (IBC), i.e. between (N−1)/rev and (N+1)/rev, where N represents the number of rotor blades 104, i.e. for a 4-bladed rotor, both systems should have the capability to operate at the frequency of 3 to 5 actuations per revolution.

Figure 1B:
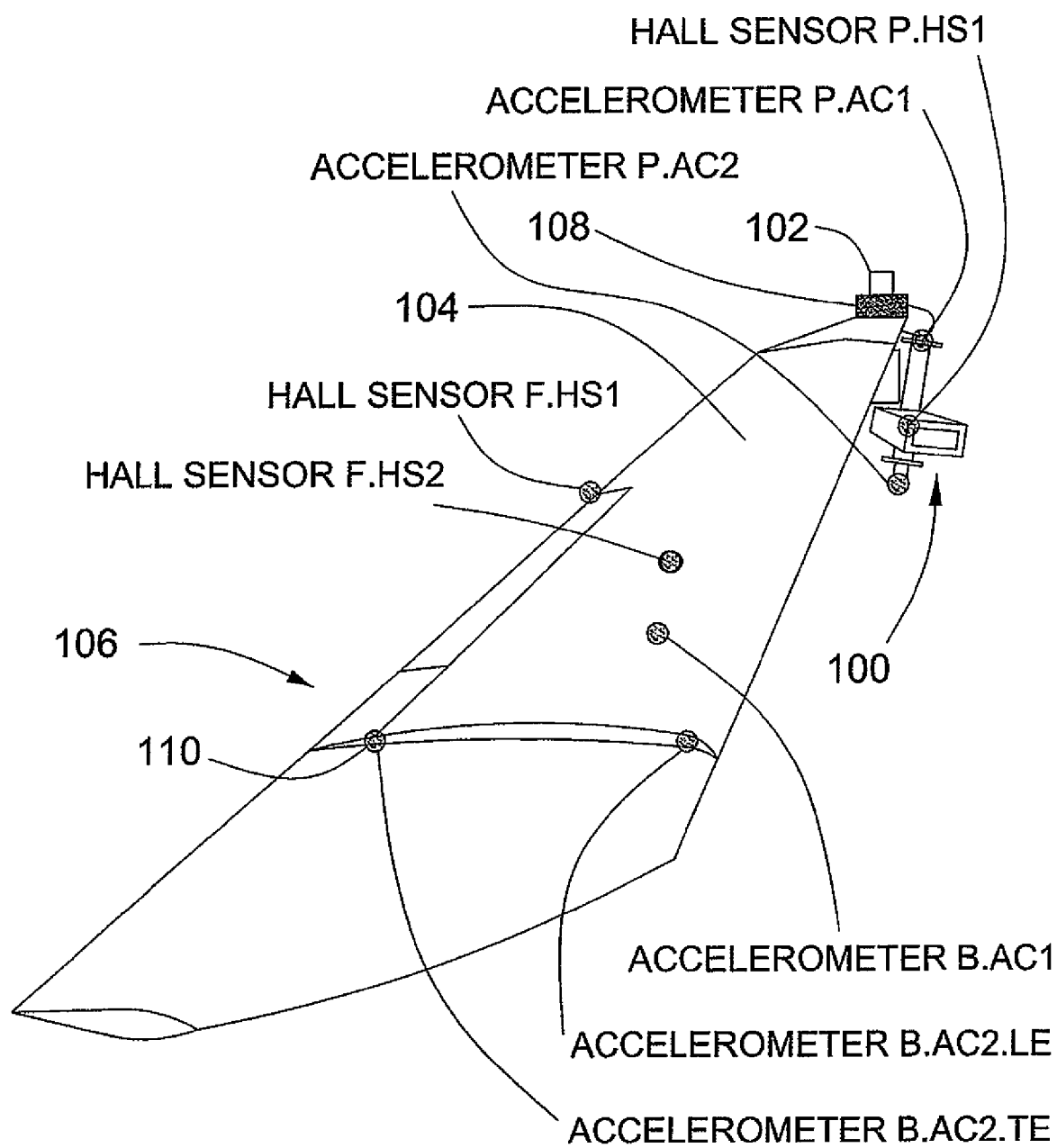
FIG. 1B depicts the sensors integral to the hybrid device of FIG. 1A.

The two systems are connected to a controller 108 located on the top of rotor hub 102, which dictates the combined operation of the two systems with the goal of minimizing vibrations. As depicted in FIG. 1B, the entire system is equipped with preferably eight (8) sensors 110 measuring vibration. Sensors 110 include a strain gauge, two hall sensors and three accelerometers mounted on rotor blade 104 and one hall sensor and two accelerometers mounted on APL 100. Sensors 110 are linked to a computer in controller 108, thus forming a closed-loop feedback control system consisting of controller 108, APL 100, ACF 106 and sensors 110. The feedback control system will be discussed in more detail in relation to FIGS. 6 and 7.

(B) Structural Control—Active Pitch Link (APL)

Figure 2A:
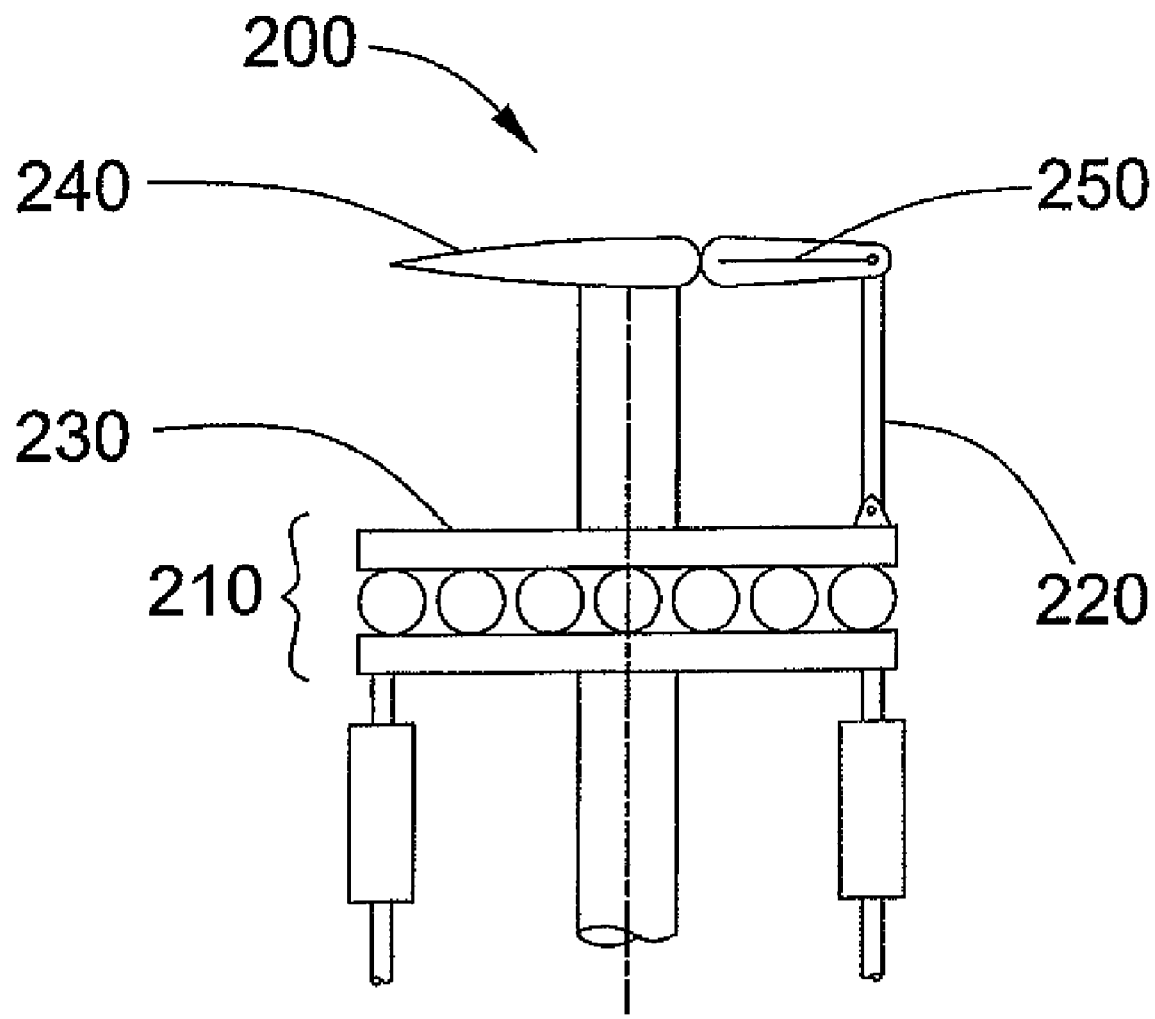
FIG. 2A depicts the main parts of a prior art helicopter rotor hub.
Figure 2B:
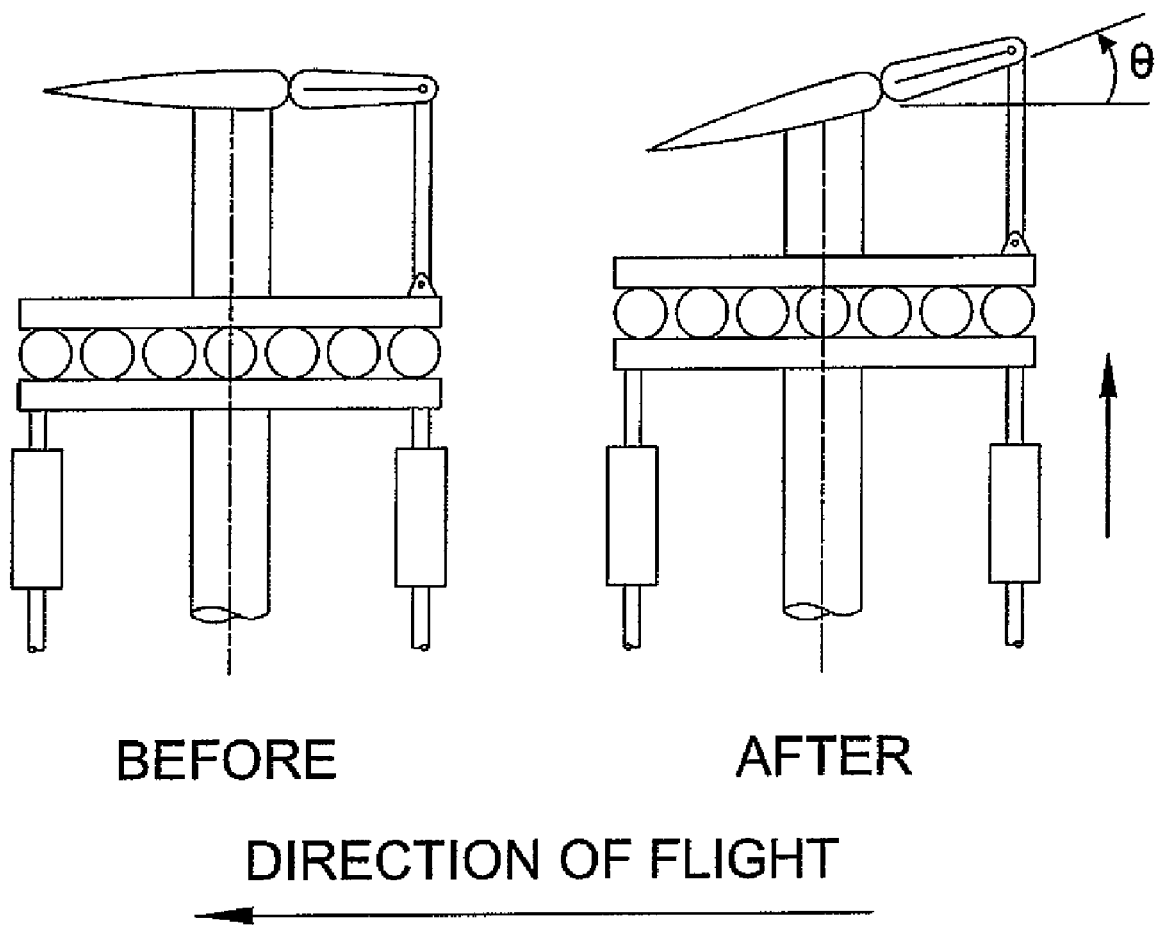
FIG. 2B depicts a collective change of the pitch angle of the rotor blades of FIG. 2A.
Figure 2C:
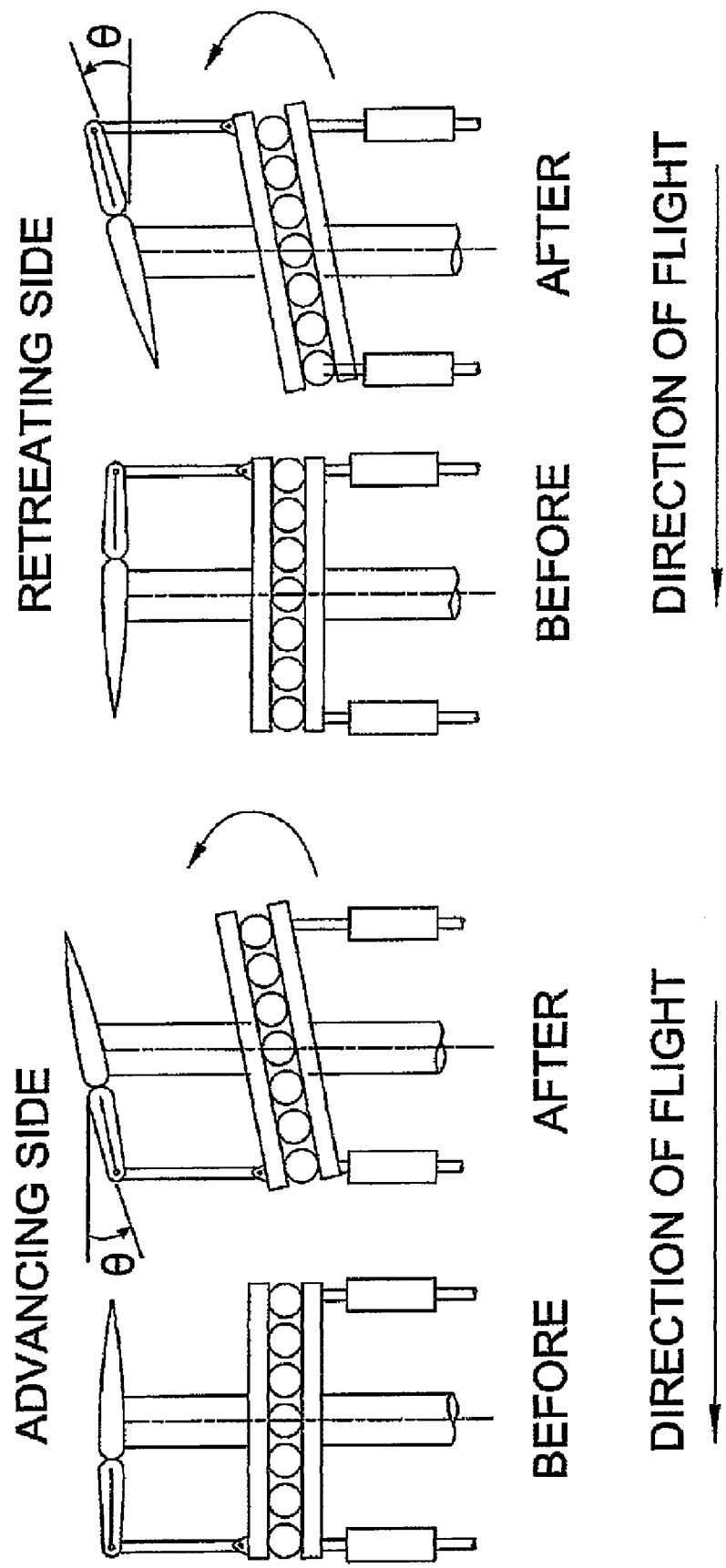
FIG. 2C depicts a cyclical change of the pitch angle of the rotor blades of FIG. 2A.

The main parts of a typical helicopter rotor hub 200 are depicted in FIG. 2A, highlighting the location of swashplate 210 as well as conventional pitch link 220. It is the lower non-rotating disk of swashplate 210, which is controlled by the pilot (not shown). When swashplate 210 is moved up-down or tilted to any direction, upper rotating disk 230 follows swashplate 210 and this motion is transferred to the rotor blade 240 via pitch link 220. The purpose of the swashplate-pitch link system is to change the pitch angle θ of rotor blade 240 and thereby the magnitude and tilt of the resultant thrust force generated by rotor hub 200. The pitch angle θ of rotor blade 240 can be changed either collectively (via an up-down motion of swashplate 210 (as depicted in FIG. 2B) or cyclically via tilting of swashplate 210 (as depicted in FIG. 2C or in any combination of both. Each rotor blade 240 is connected to swashplate 210 via an associated pitch link 220 and pitch horn 250. Pitch horn 250 is essentially the moment arm of pitch link 220, allowing the rotation ("pitching") of rotor blade 240 along its longitudinal (spanwise) axis. Changing the stiffness of rotor blade 240 at the root requires some form of active control system located at the root of rotor blade 240, either directly at the root section of rotor blade 240 or indirectly on rotor hub 200.

Active Pitch Link—Operating Principle

The Active Pitch Link (APL) of the present invention, at least in some embodiments, is a piezoelectric actuator-based device for controlling the blade stiffness at the root. The APL replaces conventional pitch link 220 on rotor hub 200. Thus, its primary purpose is to control the pitch angle of rotor blade 240 in a semi-active way. The term semi-active control is used since the APL utilizes the concept of a Smart Spring as described in U.S. Pat. No. 5,973,440 entitled "Structural Component Having Means for Actively Varying its Stiffness to Control Vibrations", issued Oct. 26, 1999 to Nitzsche et al. which is incorporated by reference herein. The described Smart Spring allows a user to control the displacement of a device in one direction only—the direction in which the load acts on the device. A fully-active control system would allow displacements in both directions, i.e. also in the direction opposite to the force acting on the device.

Figure 3A:
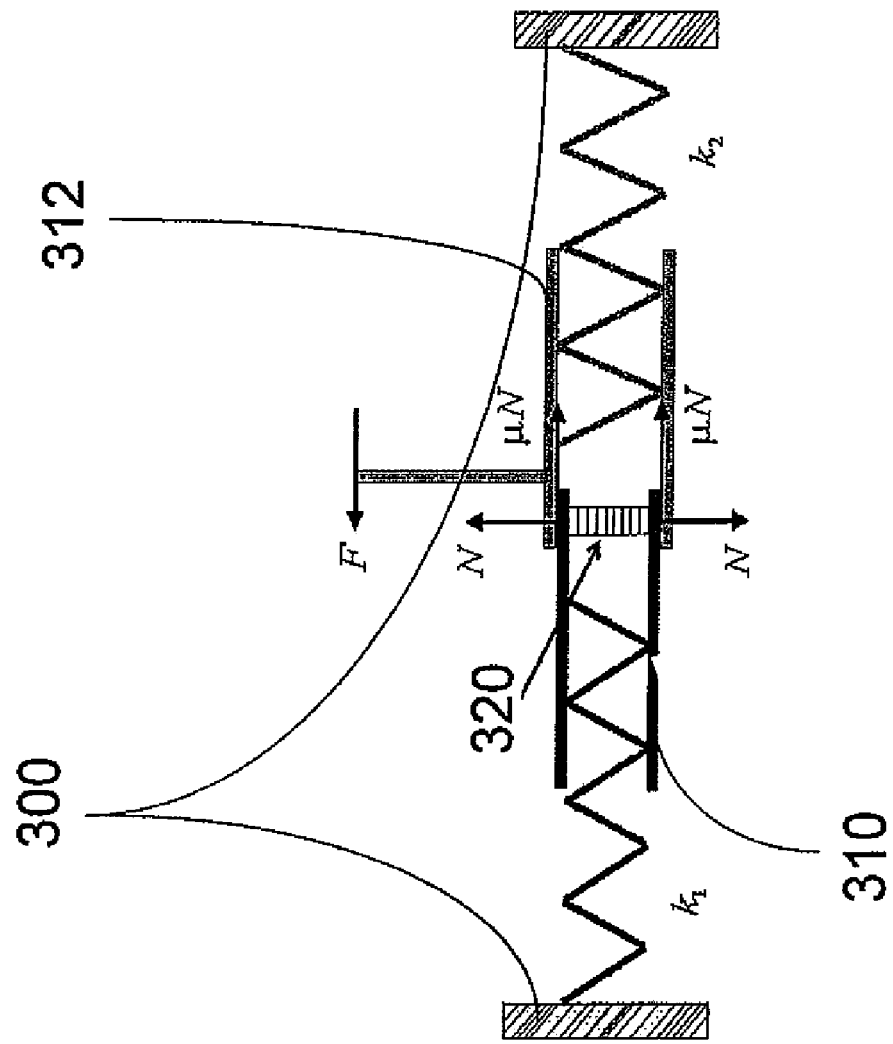
FIG. 3A depicts a prior art smart spring.

The operational principle of a generic Smart Spring is shown in FIG. 3A. Two springs, $k_1$ and $k_2$ have their ends attached to opposing walls 300 and a pair of sleeves 310, 312 that can slide one with respect to the other. An external (input) force F is applied to sleeve 312. A stack of piezoelectric actuators 320 is inserted into sleeve 310.

Referring to FIG. 3B, when the actuator is "OFF", the sleeves 310, 312 can move freely and the resulting horizontal displacement (output) is $\delta_{max}=F/k_2$. Spring $k_2$ is designed to be the "primary" load path of the APL. Referring to FIG. 3C, when the actuator is turned "ON", sleeve 310, under the action of the stack of piezoelectric actuators 320, yields and applies on sleeve 312a resultant normal force, N.

A friction force, μN is induced by the contact between the surfaces of sleeves 310, 312. If this friction force is sufficiently large and sleeves 310, 312 are forced into motion together, springs $k_1$ and $k_2$ act in series and a smaller horizontal output displacement $\delta_{min}=F/(k_1+k_2)$ is obtained because the stiffness experienced by the input force rises from the system's original $k_2$ to $k_1+k_2$. Spring $k_1$ is driven by the resultant friction force μN applied by the sleeve 310 on sleeve 312, which is controlled by the external electrical stimulus (control input) to the stack of piezoelectric actuators 320. Spring $k_1$ is called the. "secondary" path of the APL.

Thus, the horizontal output displacement of the system under the input force F varies between the referred two extremes, $F/(k_1+k_2) \leq \delta \leq F/k_2$ and the total load is distributed between the primary and the secondary load paths.

The APL system also changes its apparent mass because the stack of piezoelectric actuators 320 and sleeve 310 have inertial properties. However, this effect can be disregarded if the overall system is "stiffness dominated" (i.e., the harmonic disturbance force has a frequency much lower than the internal resonance frequencies of the APL). The dry friction between sleeves 310, 312 also creates coulomb damping, which cannot be neglected. The latter adds an important stabilizing effect to the system. Since the APL actively changes both its apparent mass and stiffness and also its internal damping, it is called an "impedance control" device.

As discussed above, within the context of helicopter applications, the active pitch link (APL) replaces conventional pitch link 220. Thus, rotor blade 240 and the APL become an integral system, which can control the twist impedance of rotor blade 240 in real time, by targeting the 1st torsional mode of rotor blade 240. However, because of the inherent coupling between blade modes (i.e. when a blade is twisted, it will generate more lift, i.e. it will bend/flap up and as a result of this motion it will generate lead-lag motion too), when the torsional mode is controlled, all modes are controlled.

Active Pitch Link—Design

Figure 4A:
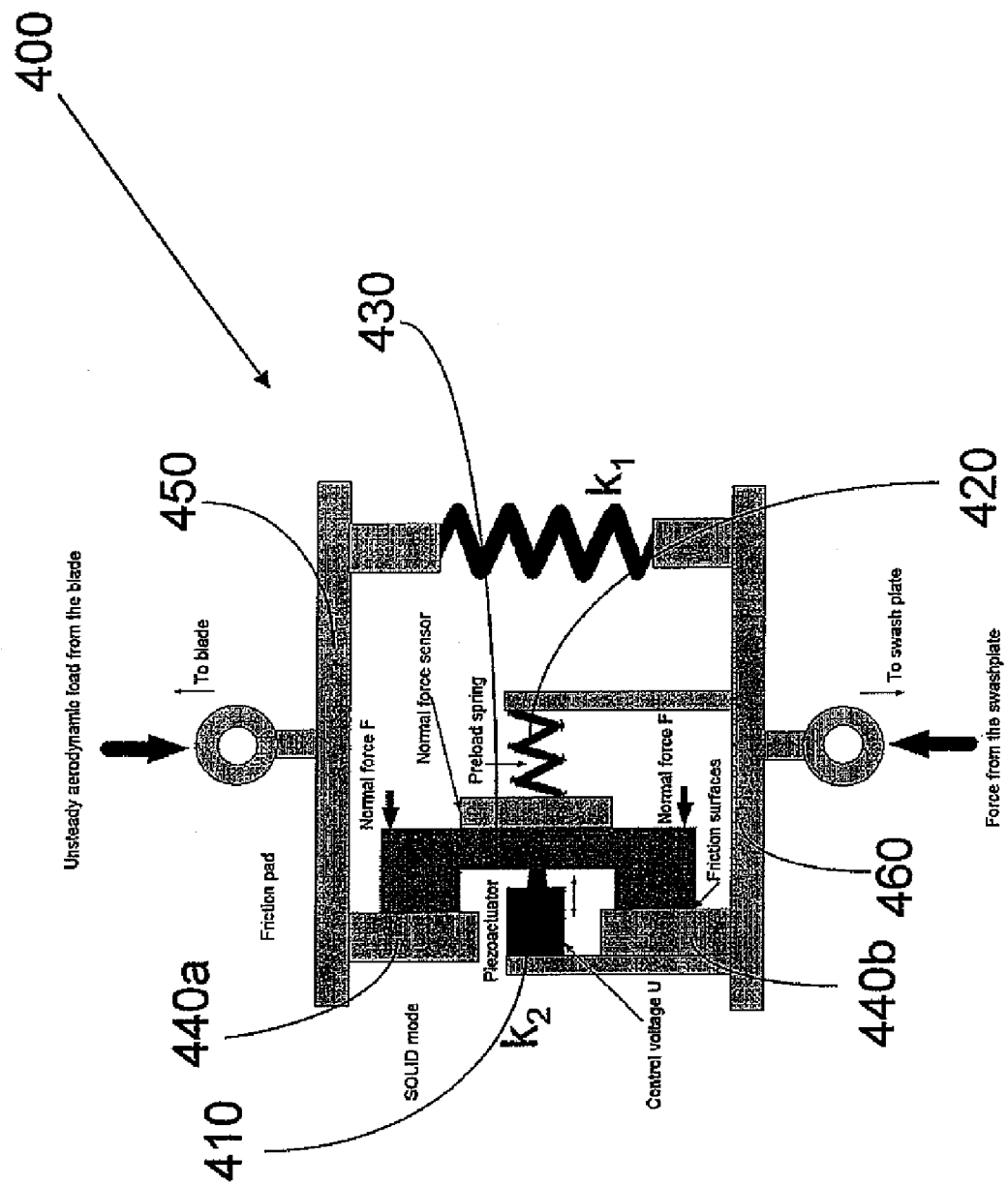
FIG. 4A depicts schematically the smart spring used in an active pitch link (APL) in the hybrid device of the present invention.

Referring to FIG. 4A, although the APL 400 of the present invention uses the Smart Spring concept, its internal configuration is significantly altered to facilitate a feature very important for aerospace applications: fail safe design. Fail safe design means that when a power failure or failure of piezoelectric actuator 410 occurs, APL 400 returns to the original "conventional pitch link" mode. In order to fulfill this fail safe design requirement, springs $k_1$ and $k_2$ are incorporated in parallel rather than in series (as in FIG. 3A). Using this configuration, the overall system stiffness can be varied between $k_1$ ("soft" link) and $k_2$ ("solid" link), instead of the ranges of $k_2$ and $k_1+k_2$.

The main parts and operation of the APL 400 are arranged in the following configuration. In the default position i.e. when piezoelectric actuator 410 is OFF, a preload spring 420 pushes a friction pad 430 to a pair of solid links 440a and 440b. The force generated by preload spring 420 is such so that the friction force between friction pad 430 and solid links 440a, 440b is larger than the overall vertical force acting on APL 400. Thus, when piezoelectric actuator 410 is OFF, all of the load will be transferred from a top plate 450 to a bottom plate 460 via load path consisting of solid link 440a, friction pad 430 and solid link 440b.

When piezoelectric actuator 410 is ON, friction pad 430 is pushed away from the solid links 440a, 440b and, when the two surfaces disengage, the entire load is transferred from top plate 450 to bottom plate 460 via "soft" spring $k_1$.

An intermediate mode of operation, called transitional mode, can also be generated. This occurs when piezoelectric actuator 410 is only partially activated (i.e. when the actuation power is somewhere between zero and the maximum voltage). In this case, sliding friction will occur between friction pad 430 and solid links 440a, 440b, thus initiating the "energy extraction" operational mode, in which vibration is reduced by extracting energy from the system via sliding friction and heat.

Figure 4C:
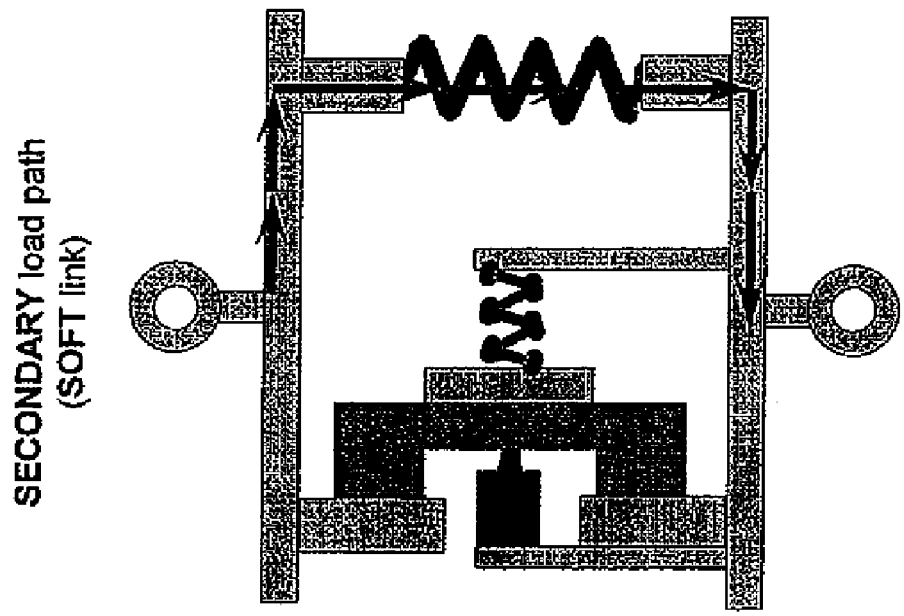
FIG. 4C depicts the secondary load path of the smart spring of FIG. 4A.
Figure 4B:
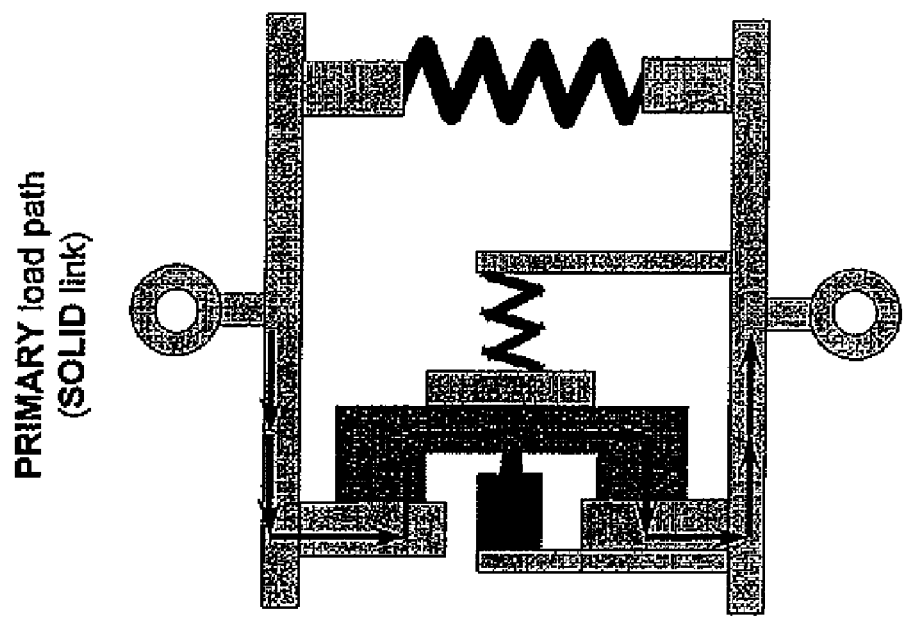
FIG. 4B depicts the primary (fail safe) load path of the smart spring of FIG. 4A.

The operational principle of APL 400 are illustrated in FIGS. 4B and 4C which depict the load paths when the actuator is switched ON and OFF.

Figure 4D:
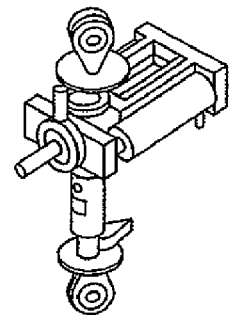
FIG. 4D depicts a perspective view of the active pitch link (APL) in accordance with the present invention.
Figure 4E:
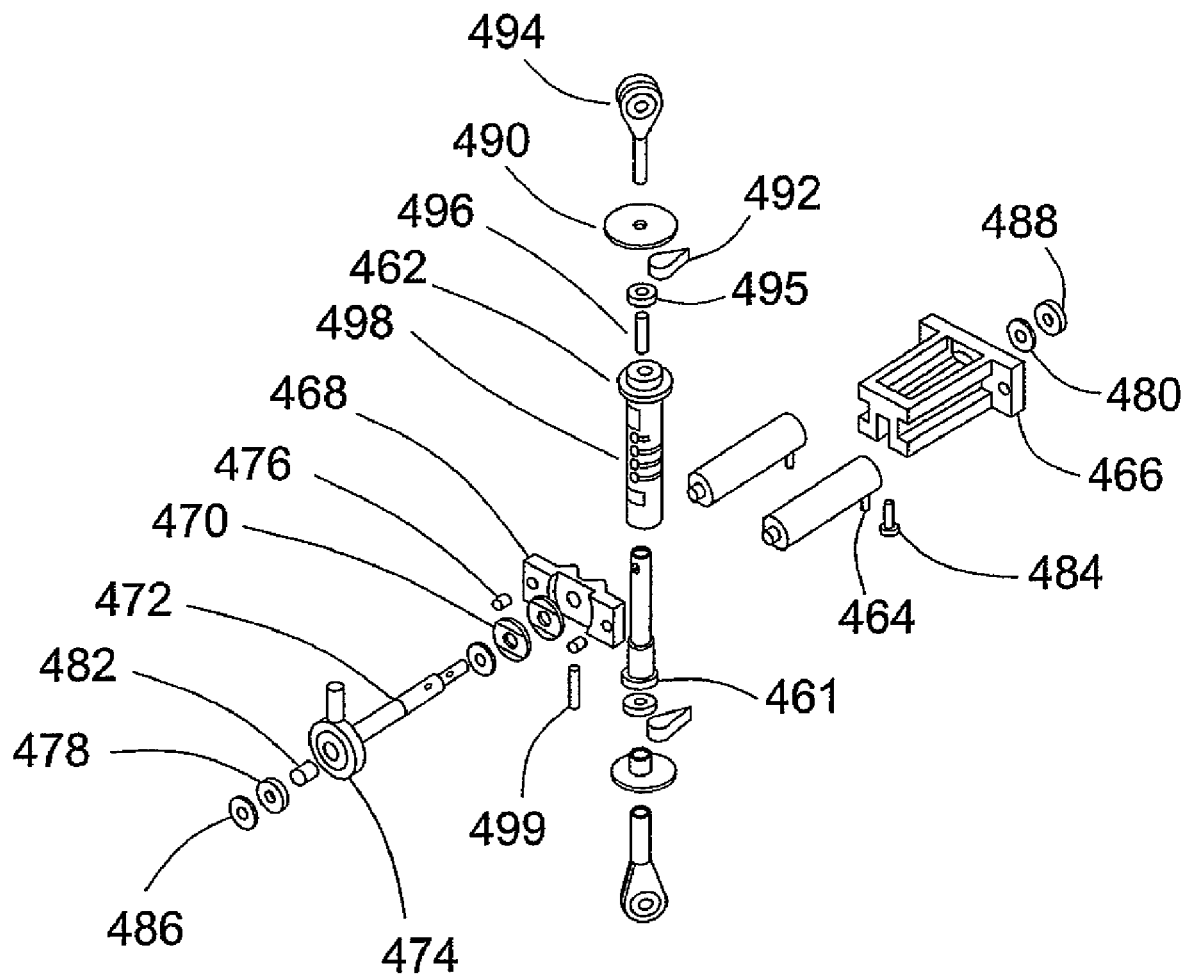
FIG. 4E depicts an exploded view of the APL in accordance with the present invention.

A more detailed depiction of APL 400 is provided in FIGS. 4D and 4E. Here, the two springs $k_1$, $k_2$ shown previously in the schematic diagram of FIG. 4A are arranged in a concentric fashion, i.e. solid link $k_2$ 461 slides into the soft link spring $k_1$ 462. Such arrangement enhances the compactness of the design, which is important because of the space limitations on a rotor hub.

The two cylindrical piezoelectric actuators 464 are held in a holder assembly 466, including friction pad 468, preload springs 470, shoulder bolt 472, load cell 474 and a pair of set screws 476.

Piezoelectric actuators 464 are off-the-shelf units from Piezomechanik Gmbh, capable of generating 1800 N block force or 60μ of displacement. Friction pad 468 is made out of brass, an effective material from friction point of view. The preload spring 470 is realized via a set of wave disc springs, which offer modularity (their number can be varied) as well as compactness. The amount of preload force can be adjusted via the number of wave disc springs applied as well as via the 2 set screws 476. The resultant force acting on the friction pad (i.e. the sum of the preload spring force and the actuation force) is monitored via load cell 474. Washers 478, 480, spacer 482, screw 484 and nuts 486 and 488 all serve to hold the whole holder assembly together.

There are two discs 490 mounted on the top and bottom of APL 400 which hold accelerometers 492, measuring both the vibratory loads as well as the relative displacement of the upper and lower swivel joints 494. The top swivel joint 494 is left threaded and connects to the pitch horn of the rotor blade, whereas the lower swivel joint 494 is right-threaded and connects to the swashplate. Nuts 495 counter swivel joints 494 and thus serve to adjust the length of APL 400.

Custom screw 496 serves to connect shoulder bolt 472 to solid link 461. This is required to ensure that the friction force generated by piezoelectric actuators 464 is independent of the centrifugal loads, which should act from the load cell 474 towards the piezoelectric actuators 464.

In addition to accelerometers 492, the performance of APL 400 can also be monitored via a built-in Hall sensor 498. Hall sensor 498, mounted on soft spring link 462, is paired up with a permanent magnet 499, mounted on friction pad 468. As these two move relative to each other, the electrical signal in the Hall sensor 498 changes and this can be related to the displacement between the two parts. The exact location of the permanent magnet 499 is adjustable since it is threaded at the bottom.

The APL depicted in FIGS. 4D and 4E operates as follows. As a default, the piezoelectric actuators 464 are OFF and preload spring 470 pushes friction pad 468 to the side of soft link spring 462. The preload force has to be set in a way so that the default friction force is large enough to overcome the vertical force acting on APL 400. Thus, solid link 461 and the top of soft spring link 462 become locked via the friction pad 468 (i.e. they cannot move relative to each other) and the load acting on APL 400 will be transferred from top to bottom via the following path: top swivel joint 494—top of soft spring link 462—friction pad 468 (link via friction)—custom shoulder bolt 472—solid link 461 (connection via screw 496)—bottom swivel joint 494.

When the piezoelectric actuators are ON, friction pad 468 slides on custom shoulder bolt 472 and disengages the friction pad 468 from the soft spring link 462. Thus, soft spring link 462 and solid link 461 can move relative to each other since there is no link (via friction) between them. As a result, all vertical load acting on APL 400 will be transferred via the soft link spring 462 through the following load path: top swivel joint 494—soft spring link 462—bottom of solid link 461 (connection via thread)—bottom swivel joint 494.

When the actuator is OFF, APL 400 operates in the solid link mode, thus providing a Fail Safe design.

Figure 4F:
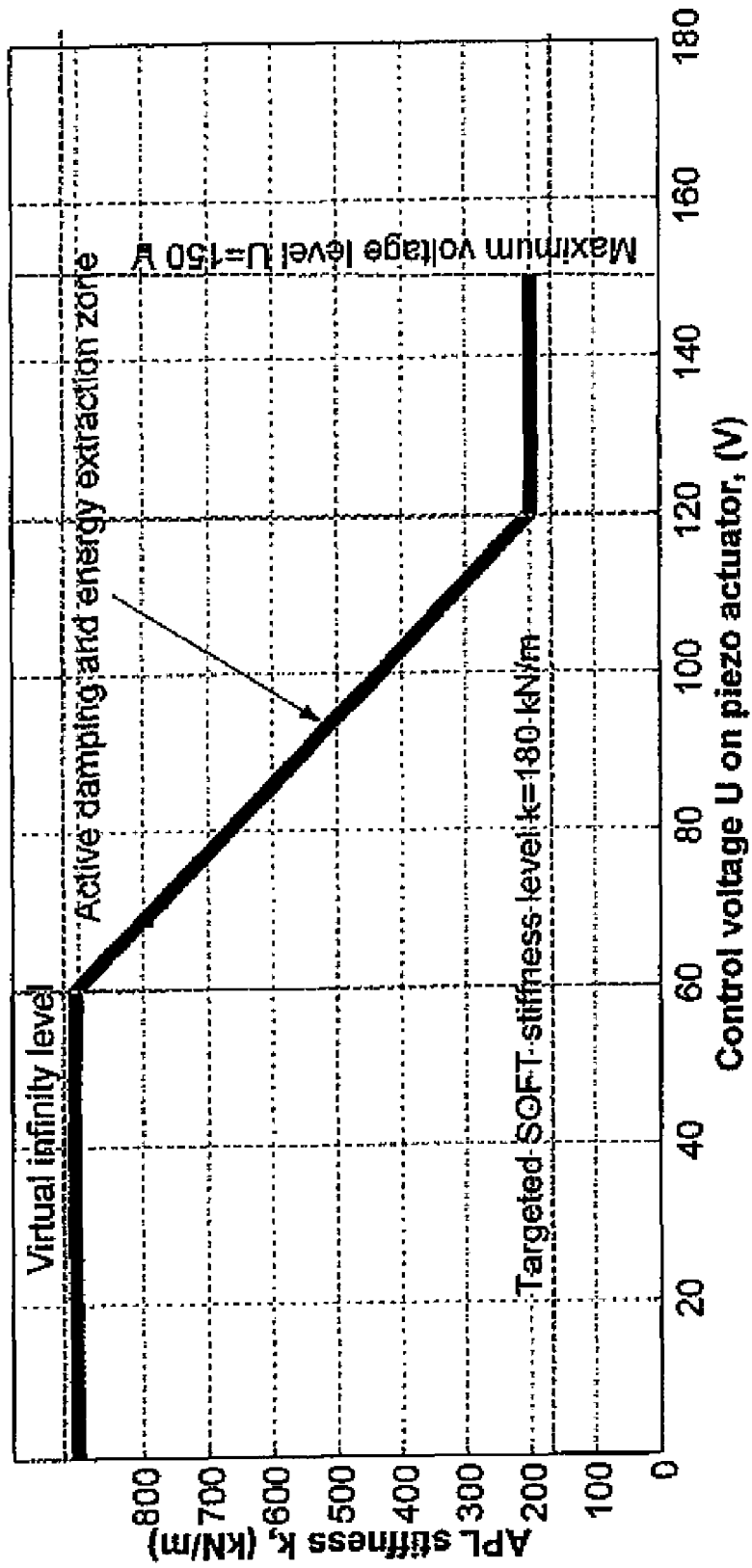
FIG. 4F depicts graphically the damping characteristics of the APL of FIG. 4A.
Figure 4G:
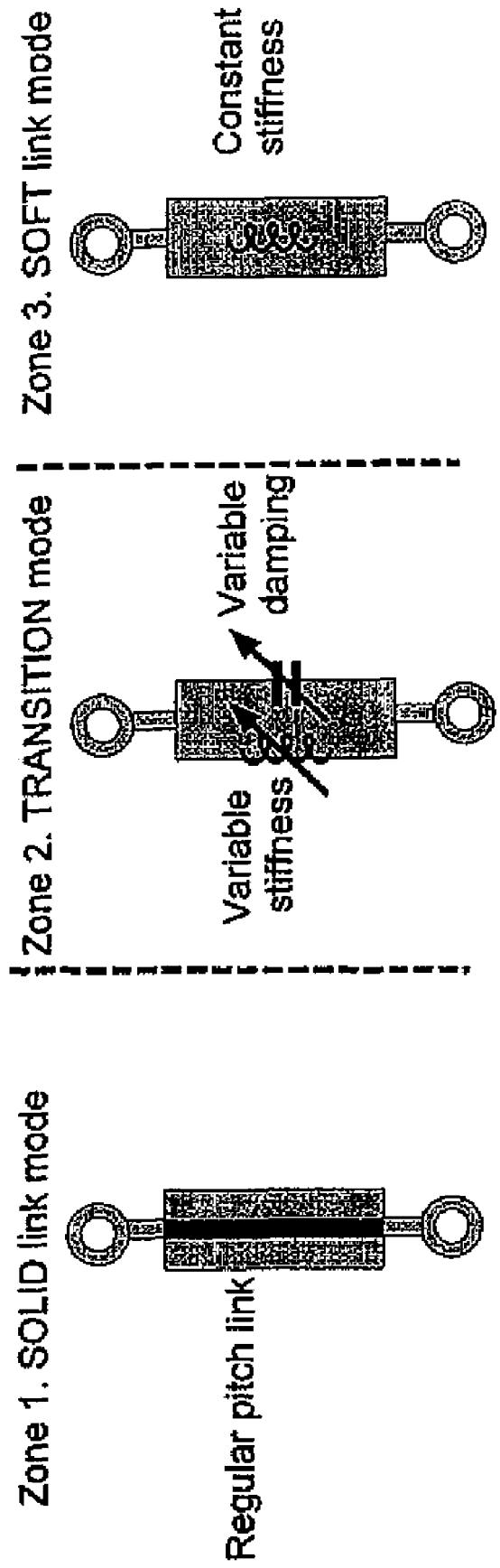
FIG. 4G depicts the theoretical modes of operation of the APL of FIG. 4A.
Figure 4H:
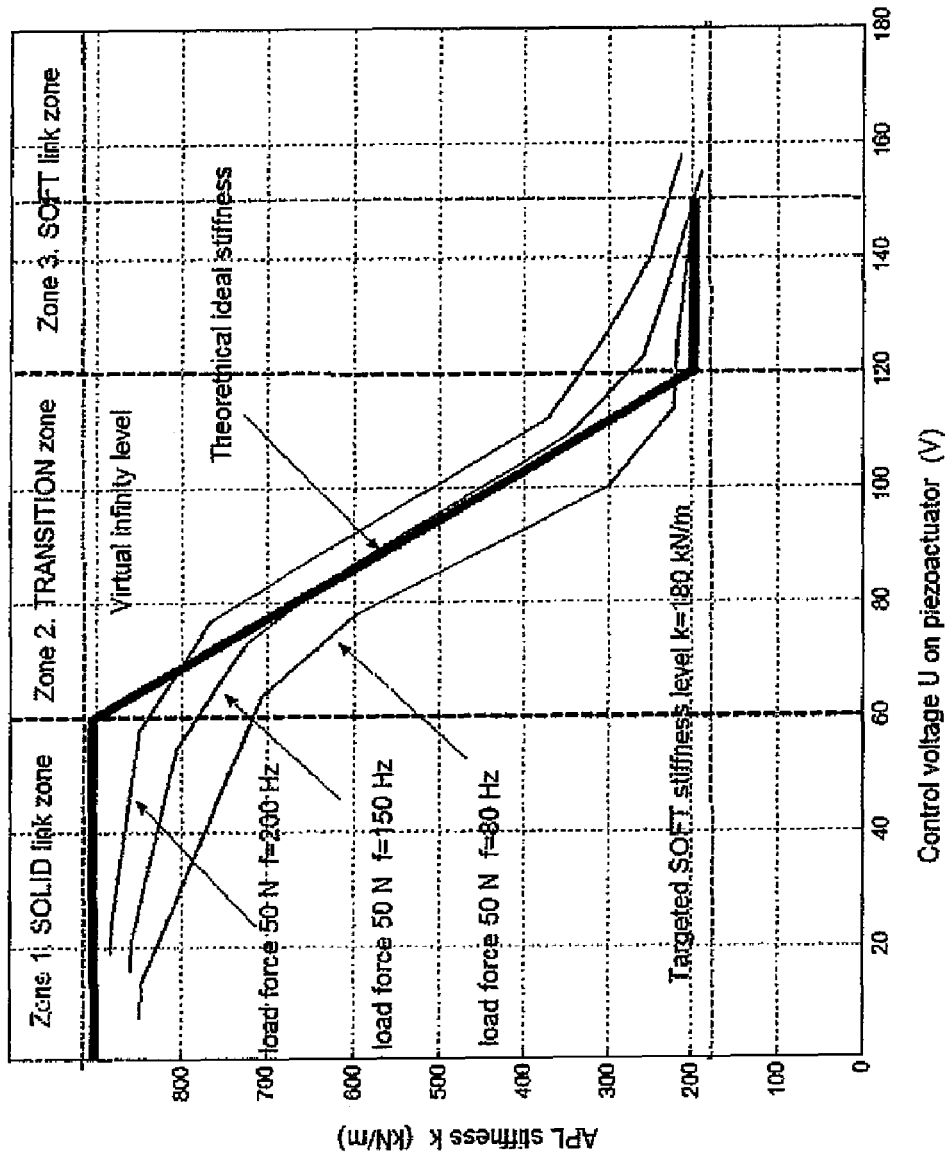
FIG. 4H depicts graphically the actual modes of operation of the APL of FIG. 4A.

The advantages of APL 400 of the present invention are numerous and include:

(a) piezoelectric actuator 410 is used to generate friction force instead of acting against the principal force, thus requiring significantly lower power consumption (3-5% of Active Twist Rotor);

(b) APL 400 incorporates a fail safe design such that when a power failure or failure of piezoelectric actuator 410 occurs, loads are transferred via spring $k_2$ representing the "solid link";

(c) the friction force generated through piezoelectric actuator 410 is independent of centrifugal loads. The system does not therefore lock purely from centrifugal loads;

(d) the system provides adjustable resultant system stiffness i.e. by careful adjustment of the actuator voltage, sliding friction can be generated between springs $k_1$ and $k_2$. The sliding friction allows adjustment of the resultant system stiffness anywhere between $k_1$ and $k_2$ as depicted in FIGS. 4F to 4H; and (e) the system allows for self-compensation due to wear i.e. if the damping characteristics of APL 400 change in time due to the wear of contacting parts or temperature increase, the control algorithm (discussed in relation to FIG. 8) is able to self-compensate for these changes.

(C) Flow Control—Actively Controlled Flap (ACF)

Figure 5A:
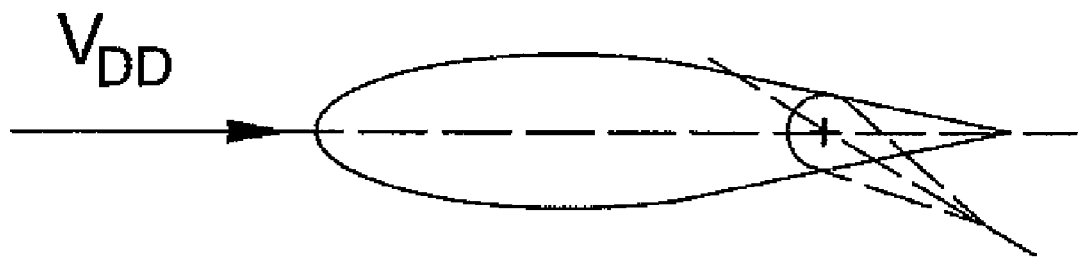
FIG. 5A depicts an active control flap operating in the high-lift mode.

As will be understood by a skilled workman, an Actively Controlled Flap (ACF) can work in two modes: either as a) a high-lift device or b) as an aeroelastic servo-tab. As depicted in FIG. 5A, the high lift device mode occurs when the blade behaves as a rigid structure, i.e. when the torsional stiffness of the rotor blade is very high. In this case, the local lift of the blade section is increased when the flap is deflected down.

Figure 5B:
FIG. 5B depicts an active control flap operating in the servo-tab mode.

As depicted in FIG. 5B, the aeroelastic servo-tab mode occurs when the blade behaves as an elastic structure, i.e. when the torsional stiffness of the blade is too low. In this case, the "soft" blade section rotates as a reaction to the flap deflection, i.e. the local lift of the blade section will increase when the flap is deflected upwards, in the opposite direction than before. However, this second mode can ultimately yield much higher overall blade lift than the first mode, because the angle of attack of the entire blade is increased in the servo-tab mode. In other words, if the blade is made "soft" enough in torsion, it can be essentially twisted up/down by activating the flap up/down, respectively.

It has been shown in the prior art that usually the servo-elastic tab mode is more effective for controlling vibration. Therefore, the operation of the present invention incorporates an Actively Controlled Flap (AOF) tailored to produce upward deflections only.

Figure 5C:
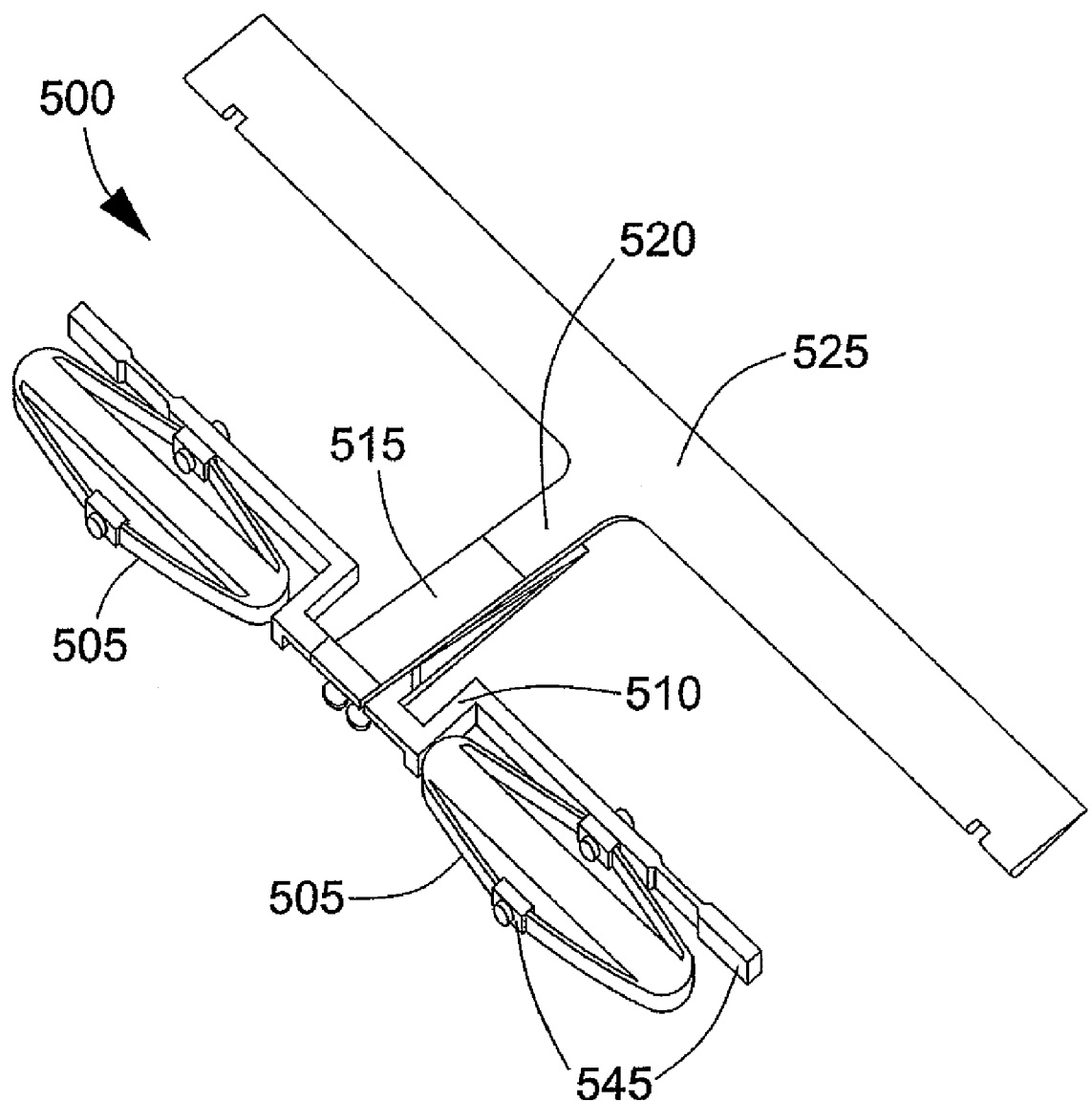
FIG. 5C depicts an active control flap in accordance with the present invention.

The design of the ACF of the present invention is depicted in FIG. 5C. The ACF mechanism produces 4 degrees of deflection up (only) at a frequency of at least (N+1)/rev, where N is the number of rotor blades coupled to the rotor hub.

The proposed ACF 500 shown in FIG. 5C is driven by two piezoelectric actuators 505 which can operate at a frequency of up to 200 Hz. Hence, the system is capable of producing flap deflections corresponding to 8/rev for the worst case scenario of a scaled rotor with 1,555 RPM=25 Hz, i.e. well above the required (N+1)/rev (i.e. 5/rev for a 4-bladed rotor). The system is also capable of producing 4 degrees of deflection in the upward direction only.

Figure 5D:
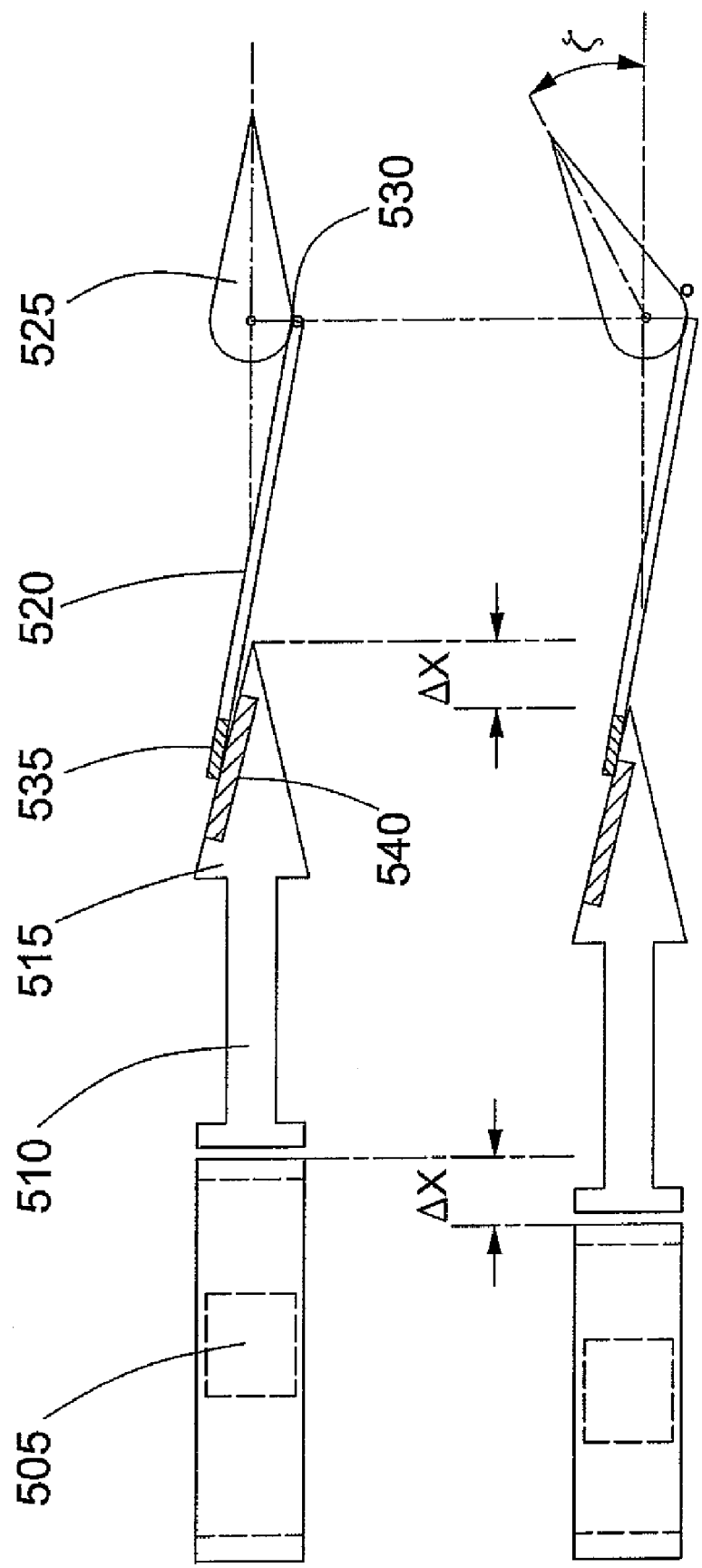
FIG. 5D depicts a side view of the active control flap of FIG. 5C with the piezoelectric actuators in the "off" and "on" positions.

As depicted in FIGS. 5C and 5D, the basic principle of ACF 500 is that a sliding rod 510 connected to the actuators 505 slides back and forth. The rod end is connected to a wedge 515 which then slides on a moment arm 520 linked to the flap 525 via a hinge point 530. As piezoelectric actuators 505 are activated, they increase their length and as a result sliding rod 510 moves forward ($\Delta X$). At the same time, moment arm 520 moves down, thus rotating flap 525 up. Wedge 515 and moment arm 520 each contains a magnet 535, 540 of opposite poles which create a sliding link between the two parts. Magnets 535, 540 are sized in a way so that the two parts of moment arm 520 and sliding rod 510 do not lock. Note, however, that because helicopter blades typically operate at positive angles of attack, the aerodynamic force acting on the flap will always help to produce the upward deflection, whereas wedge 515 moving towards the trailing edge will push flap 525 down.

Figure 5E:
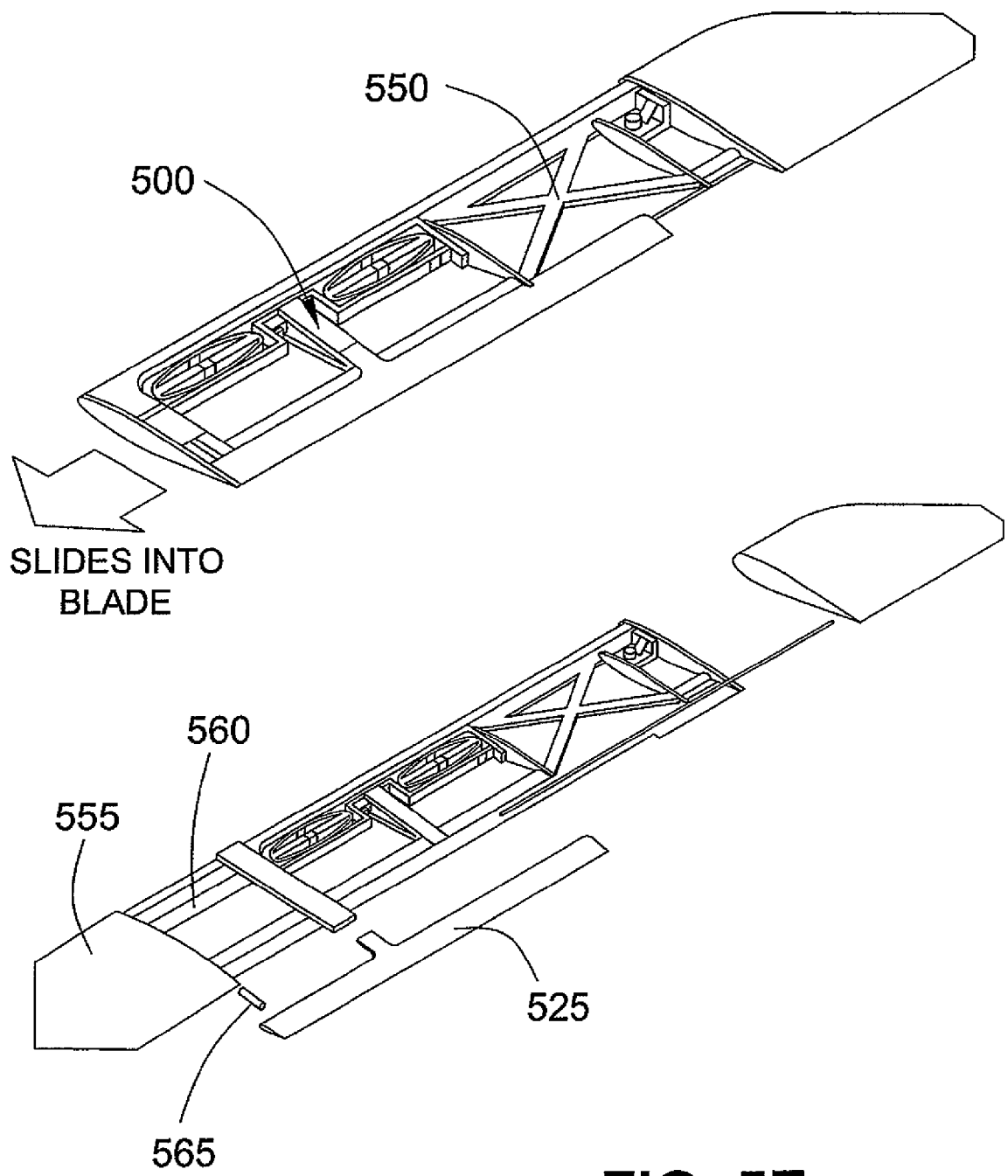
FIG. 5E depicts the skeleton and frame to which the active control flap of FIG. 5C is attached.
Figure 5F:
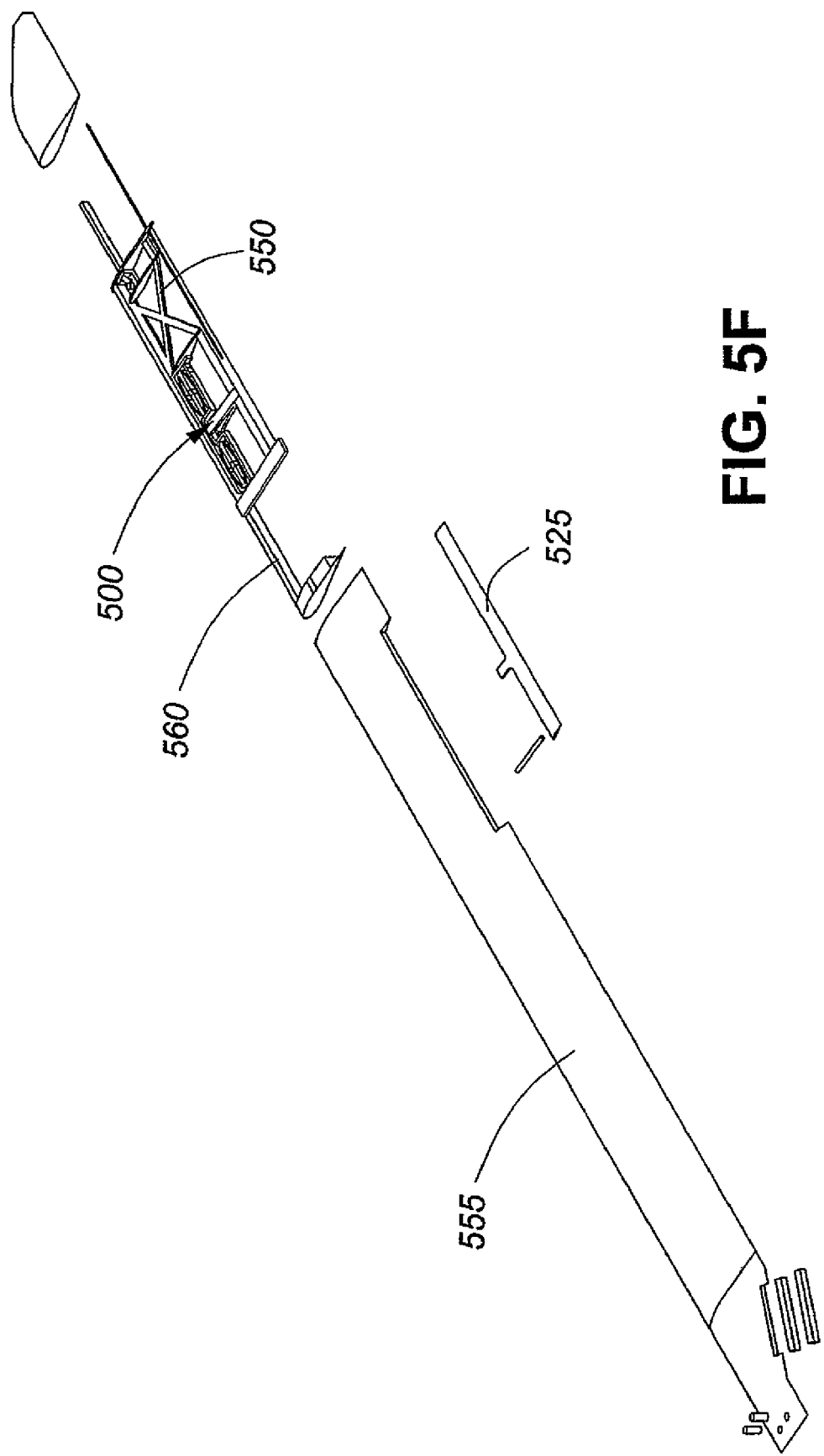
FIG. 5F depicts a fully assembled rotor with the active control flap of FIG. 5C.

The flap system shown in FIG. 5C is attached to rotor blade 555 shown in FIGS. 5E and 5F via the attachment points 545 through a skeleton 550 (See FIG. 5E). Skeleton 550 is a removable part of rotor blade 555 which, during assembly, is slid into rotor blade 555 from the tip end. Skeleton 550 is a lightweight structure machined out of Titanium and optimized to bear stresses arising from the centrifugal loads of ACF 500. ACF 500 slides into frame 560, which is glued from inside to the skin of rotor blade 555. Frame 560 features a nylon guiding rail for skeleton 550. The two parts are connected to each other via a pin 565, which is again sized to bear the resultant centrifugal loads from skeleton 550 and ACF 500. The whole blade assembly is shown in FIG. 5F.

(D) Operation of Hybrid Device

It has been shown in the prior art that vibration on helicopters can be reduced relatively successfully by imposing blade pitch angle changes of about 1 degree at a frequency ranging between (N−1)/rev to (N+1)/rev. It is for this reason that an Actively Controlled Flap (ACF) is preferred to be operated as an aeroelastic servo-tab instead of a high-lift device.

Achieving 1 degree pitch angle change, however, is at the limit of most flow control devices, such as the Active Twist Rotor (ATR) or Actively Controlled Flap (ACF). Larger pitch angle changes would lead to more significant reductions of vibration. The present invention allows the pitch angle change imposed by a flow control device to be improved by combining the flow control device with a structural control device. The structural control device serves to reduce the torsional stiffness of the blade whenever the flow control device is activated. More specifically, the blades are made instantaneously "softer" in torsion (twist) and thus the flow control device imposes larger pitch angles when activated.

This is the basic principle of the present invention, and a specific example would combine the Active Pitch Link (APL) (capable of controlling blade torsional stiffness) with the Actively Controlled Flap (ACF) (in the aeroelastic servo-tab mode) to create a "hybrid" control system.

Figure 6A:
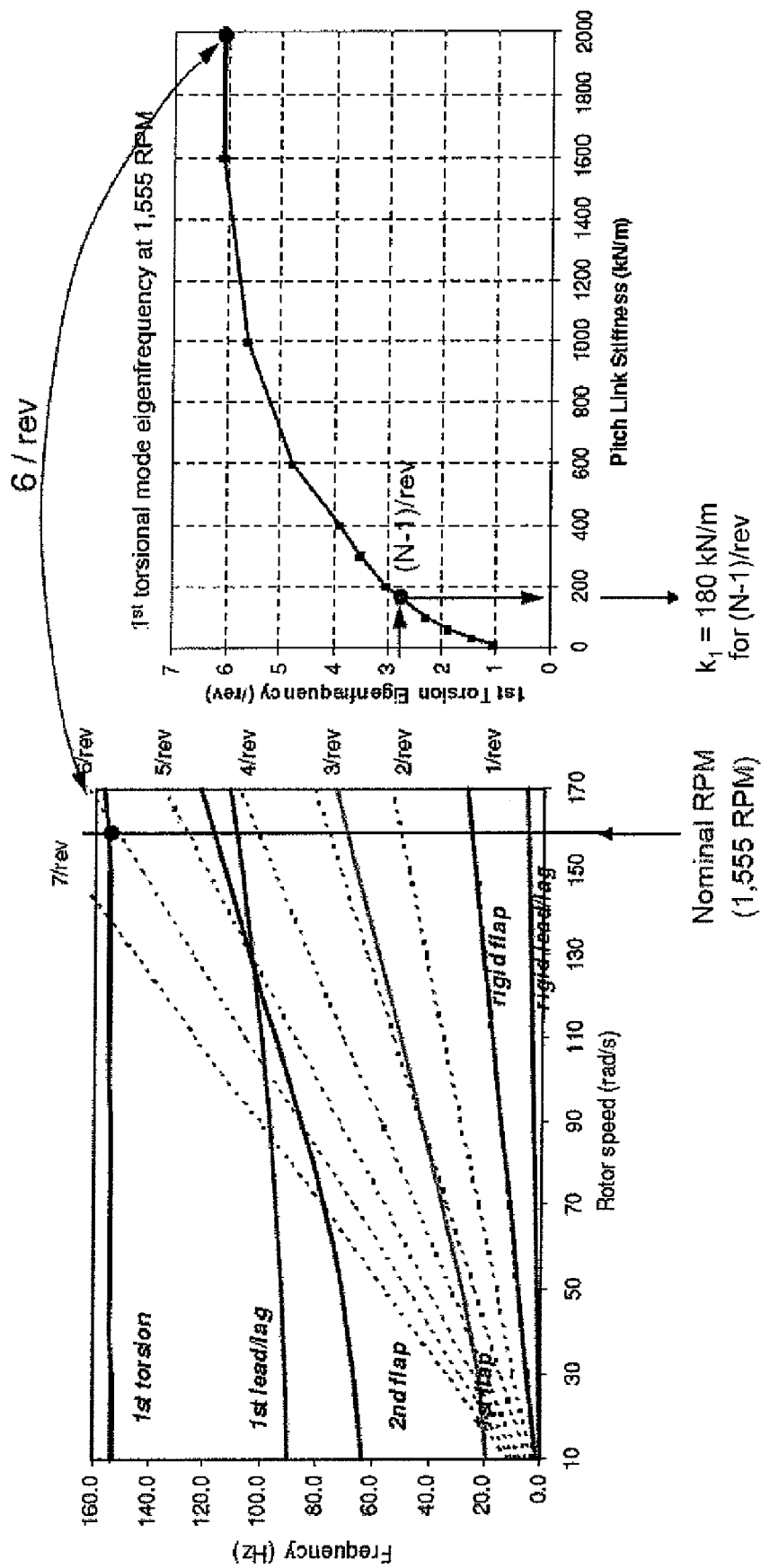
FIG. 6A depicts the fan plot for a helicopter blade and the effect of pitch link stiffness on torsional mode frequency.

The first condition of the hybrid control system is the careful selection of the stiffness of secondary "soft mode" spring $k_1$ of APL 400. This value is selected in such a way that the natural frequency of rotor blade 240 in torsion, which is linked directly to torsional stiffness, (typically in the range of 6/rev) is brought down to the actuation frequency of the flow control device, APL 400 in the specific case of this invention (3/rev to 5/rev). The selection procedure of the soft mode spring stiffness is depicted in FIG. 6A. On the left hand side, the fan plot of a typical helicopter blade is shown, illustrating that the natural frequency in torsion occurs at about 6/rev frequency. On the right hand side, a graph showing the result of a sensitivity study is shown. It depicts the variation in natural frequency in torsion with the resultant pitch link stiffness of rotor blade 240. If, for example, the torsional mode of rotor blade 240 is to be brought down to 3/rev frequency, the stiffness of soft mode spring $k_1$ should be 180 kN/m according to the graph. Using this method, when the ACF is activated at 3/rev frequency and at the same time the APL is also activated bringing down the torsional frequency of rotor blade 240 to 3/rev, rotor blade 240 will resonate in torsion and thus larger twist angles can be achieved.

Figure 6B:
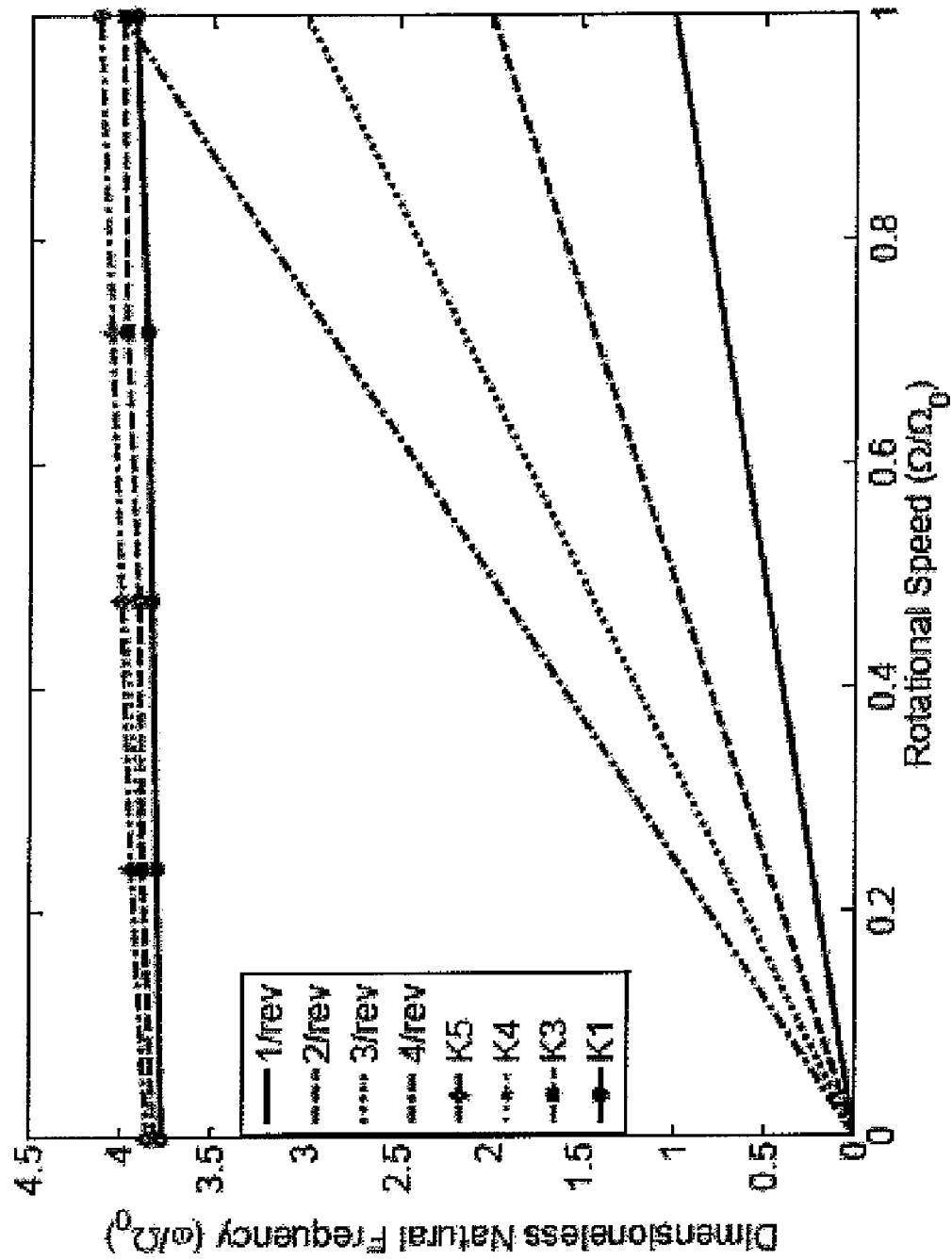
FIG. 6B depicts an experimental demonstration of centrifugal tests to show the reduction of torsional stiffness via altering the resultant stiffness of the pitch link.

FIG. 6B shows an experimental demonstration of the above claim from centrifugal tests. Note that for these tests a different blade was used than that described in the above computational studies. This meant that the "Soft Link" mode was expected to be achieved at a different spring stiffness than in the computational results shown above. Various spring stiffnesses were tested, ranging from a practically infinite value ($k_5 \sim 2,000$ kN/m), representing the "Solid Link" mode of the APL, to a very low one ($k_1 = 10.9$ kN/m) representing the "Soft Link" mode. Intermediate spring values were also considered to represent the transitional mode, i.e., $k_4 = 160.0$ kN/m, $k_3 = 82.7$ kN/m. From the fan plots, it is evident that the first torsional mode is indeed affected by the variation of the resultant pitch link stiffness at all rotational speeds. As expected, the torsional stiffness decreases as the APL becomes "softer". The magnitude of the change is viewed relatively small, which would call for even lower APL stiffness in future iterations. However, the concept of reducing torsional stiffness via altering the resultant stiffness of the pitch link is successfully demonstrated in these experiments.

Figure 7:
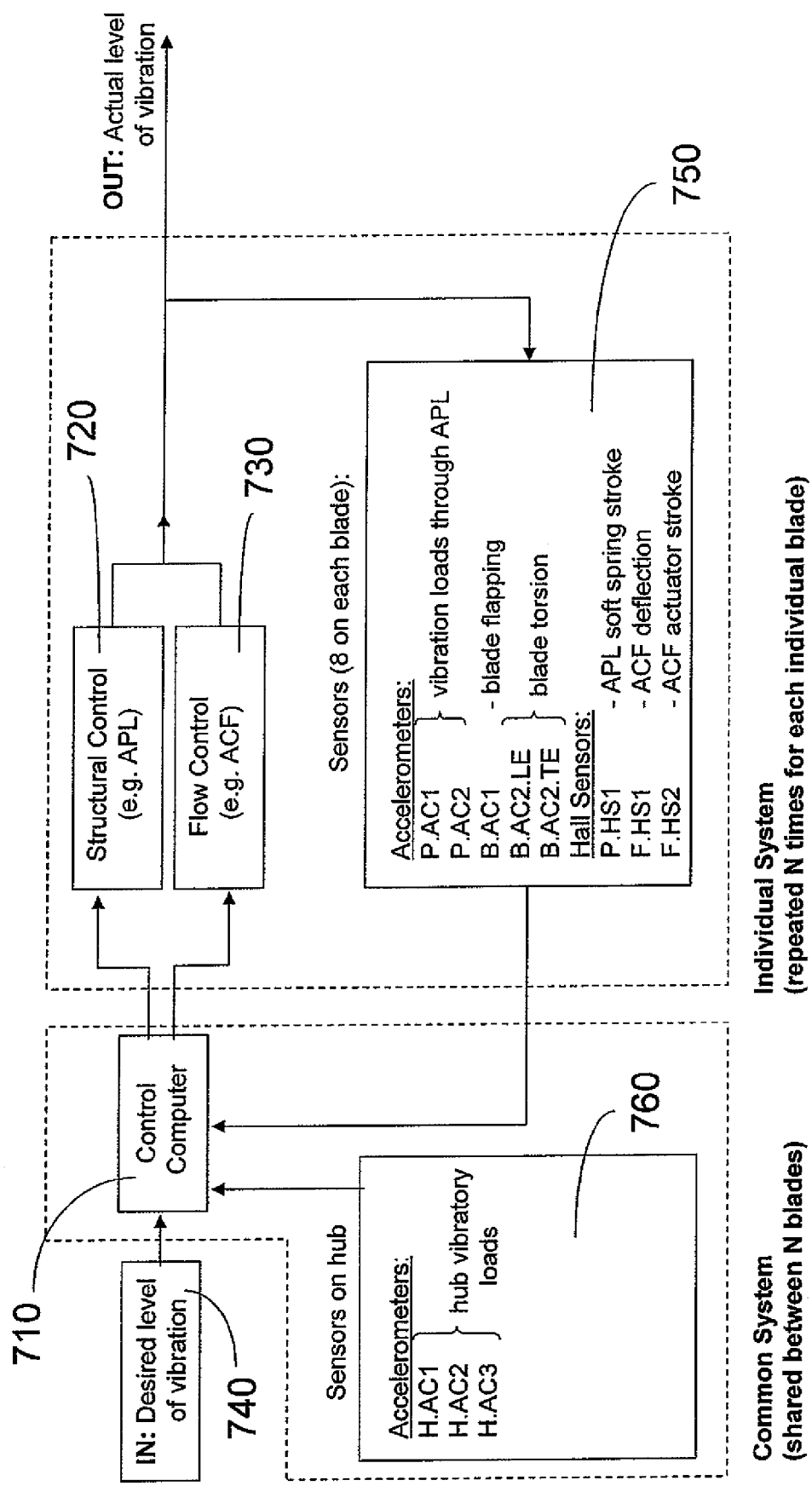
FIG. 7 is a block diagram depicting the control system of the hybrid device of the present invention.

A block diagram of the "hybrid" control system is depicted in FIG. 7. As highlighted in the figure, there is one central control computer 710 in the system, located preferably on the top of rotor hub 102 (See FIG. 1A). Control Computer 710 serves all N blades. In order to realize the Individual Blade Control (IBC) integral to the present invention, each rotor blade 104 (See FIG. 1A) has to be equipped with its own individual control system, i.e. each rotor blade 104 includes a structural control device (e.g. APL 400) 720 and a flow control device (e.g. ACF 500) 730 i.e. structural control device 720 and flow control device 730 will occur N times on helicopter rotor hub 102. As shown in the figure, the control reference parameter (IN) 740 is the desired level of vibration. The actual level of vibration is measured via the eight (8) sensors 750 located on each rotor blade 104 (See element 110 in FIG. 1B). Sensors 750, along with three (3) accelerometers 760 located on the rotor shaft (not shown in the FIGS. 1A and 1B) provide a feedback signal to control computer 710, which then determines the optimum strategy for minimizing vibration and provides a control signal to structural control device 720 and flow control device 730.

FIG. 8 depicts a flow chart detailing the control steps performed by control computer 710 of FIG. 7. First, vibration data is received from sensors 110 at step 805. This data, along with a certain portion of the time history of previous data, are analyzed via Fourier transformation at step 810 to determine the dominant vibration frequency ($f_{VIB}$) and vibration amplitude ($P_{VIB}$).

Following this, the type of control strategy (i.e. "ACF only", "APL only" or "hybrid" control) is determined at steps 820, 830 or 840 based on either the manual input of the pilot/operator or a database of experimental tests, in which the various control strategies have been linked to certain vibration levels.

Starting from the simplest control strategy, if the "ACF only" method is selected at step 820, then at step 825 the flap actuation frequency and amplitude is set based on the transfer functions obtained from experiment/flight tests. Control voltage $U_{ACF}$ applied to the piezoelectric actuators will determine the amplitude of flap deflection. This value can be linked to the vibration frequency ($f_{VIB}$) and amplitude ($P_{VIB}$) and should be set between 0 V and 150 V for the particular design of ACF 106 (see FIG. 1A) presented herein. The frequency of actuation can then be linked solely to the frequency of vibration and it should be between (N−1)/rev to (N+1)/rev frequency for best results. APL 100 (See FIG. 1A) is idle in this case, with the solid link mode being functional.

If the "APL only" method is selected at step 830, then at step 835 the APL actuation frequency and amplitude will be set based on the transfer functions obtained from experiment/flight tests. Control voltage $U_{APL}$, however, will not be linked this time to the amplitude of actuation, but to the torsional frequency of rotor blade 104 (see FIG. 1A). As has been shown in experiment (see FIG. 4H), the resultant stiffness of APL 100 can be set to any value between $k_1$ and $k_2$ by setting $U_{APL}$ between 60 V and 120 V. When an intermediate value is set, APL 100 is in the transitional mode and it extracts energy from the system via sliding friction. This mode of operation is called the "energy extraction mode" and APL 100 is most efficient in this mode when applied on its own (without any Flow Control device) Since the stiffness of APL 100 is linked to the blade resonance frequency in torsion, the blade frequency can essentially be set to any desired value by activating APL 100. The choice of the desired blade torsional frequency, and thus of $U_{APL}$, will be driven by the frequency of vibration ($f_{VIB}$). The frequency of actuation will also be driven by the frequency of vibration ($f_{VIB}$). Note that in this case ACF 106 is idle.

Finally, if the hybrid control method is selected at step 840, both ACF 106 and APL 100 are operational at the same time. First, the ACF operational mode is selected at step 850 based on pilot input or a database, in which vibration levels have been linked to the choice of operational mode. When the Servo Flap mode is selected, then first the ACF actuation parameters (frequency $f_{ACF}$ and amplitude $U_{ACF}$) are determined at step 860 from the transfer functions from experiment, similar to the "ACF only" mode described above. Next, at step 865, phase angle φ is determined based on experience from tests. The phase angle determines the delay between forcing and response. It is known to be 90 deg at the resonance frequency, whereas it decreases to 0 deg below the resonance frequency and increases to 180 deg above the resonance frequency. The phase angle will dictate that when (in terms of rotor azimuth angle) APL 100 should be activated relative to the actuation of ACF 106 already determined at step 860. Once the phase angle is known, the APL frequency ($f_{APL}$) and control voltage ($U_{APL}$) can be determined. Note that in contrast to the "APL only" configuration, these two parameters depend not only on the vibration frequency ($f_{VIB}$) but also on phase angle (φ) and the ACF frequency ($f_{ACF}$) as well, as shown in step 880. The method of determining the control parameters for the High-Lift device mode, i.e. steps 870 and 875, is analogous to the above description, with the difference that $f_{ACF}$, $U_{ACF}$ and φ are determined from the transfer function for the high-lift flap mode.

The outputs from control computer 710 are the actuation parameters for the Flow Control (i.e. ACF 106) and Structural Control (i.e. APL 100) systems: these are sent to the control systems at step 890. Note that the feedback loop between the outputs and the inputs is realized outside of control computer 710 as shown in FIG. 7.

Thus, in selected embodiments, the Active Pitch Link may serve as a backup system for a "swashplateless" helicopter rotor controlled primarily by a Flow Control device (such as either an Actively Controlled Flap or Active Twist Rotor). Combining such Flow Control device with the Active Pitch Link can have at least two advantages:

a) the Active Pitch Link can improve the efficiency of the Flow Control device by lowering the torsional stiffness of the blade b) the Active Pitch Link can serve as a control system backup for the case that the Flow Control device fails. When the Flow Control device fails and is unable to serve its purpose as the primary means of rotor control, the blades (pitch angle) can still be controlled via the Active Pitch Link.

Although the hybrid control device of the present invention has been described in relation to rotor blades on a helicopter, it will be understood by those in the art that the invention may be applied to other devices employing blades in which vibration control is desired. For example, the hybrid control device may be applied to the blades of a wind turbine which behaves in a manner similar to a rotor blade such that vibration control would be beneficial.

The invention claimed is:

1. A feedback control system for controlling vibration in a rotor blade, wherein the rotor blade is coupled to a rotor hub and has at least a torsional stiffness and a pitch angle associated therewith, the feedback control system comprising:
   (a) a flow control device for adjusting the pitch angle of the rotor blade;
   (b) a structural control device for adjusting the torsional stiffness of the rotor blade;
   (c) a plurality of sensors attached to the rotor blade; and
   (d) a control computer communicating with the flow control device, the structural control device and the plurality of sensors,
wherein vibration data from the sensors is received by the control computer and control signals are generated by the control computer to reduce the torsional stiffness of the rotor blade with the structural control device and simultaneously increase the pitch angle of the rotor blade with the flow control device.

2. The feedback control system of claim 1, wherein the flow control device is an actively controlled flap (ACF) mechanism.

3. The feedback control system of claim 2, wherein the structural control device is an active pitch control (APL) mechanism.

4. The feedback control system of claim 3, wherein the APL mechanism comprises at least a first spring controlled by an APL piezoelectric actuator, wherein when the APL piezoelectric actuator is off, a friction force is created between a friction pad and first and second solid links, the first and second solid links coupled to a top plate and a bottom plate respectively of the APL mechanism, and wherein a load associated with the rotor blade is carried by the first spring.

5. The feedback control system of claim 4, wherein the APL mechanism further includes a second spring extending between the top plate and the bottom plate and wherein, upon actuation of the APL piezoelectric actuator associated with the first spring, the friction force is removed, and the load associated with the rotor blade is carried by the second spring.

6. The feedback control mechanism of claim 5, wherein, upon partial activation of the APL piezoelectric actuator associated with the first spring, sliding friction occurs between the friction pad and the first and second solid links.

7. The feedback control system of claim 6, wherein the torsional stiffness of the rotor blade is determined by a selected voltage applied to the piezoelectric actuator of the first spring.

8. The feedback control system of claim 7, wherein the selected voltage applied to the piezoelectric actuator of the first spring is selected to bring the natural frequency of the rotor blade in torsion down to the actuation frequency of the flow control device.

9. The feedback control system of claim 8, wherein the ACF mechanism comprises:
   (a) at least one ACF piezoelectric actuator;
   (b) a sliding rod, wherein a first end of the sliding rod is coupled to the at least one ACF piezoelectric actuator and a second end of the sliding rod forms a wedge;
   (d) a moment arm magnetically coupled to the wedge; and
   (e) a flap linked to the moment arm at a hinge,
wherein, upon actuation of the at least one ACF piezoelectric actuator, the sliding rod causes the moment arm to slide in a downwardly direction, thereby rotating the flap in an upwardly direction about the hinge.

10. The feedback control system of claim 9, wherein the ACF mechanism produces four degrees of deflection in an upward direction at a frequency of at least (N+1)/revolution where N is the number of rotor blades coupled to the rotor hub.

11. The feedback control system of claim 9, wherein the number of the plurality of sensors is eight.

12. The feedback control mechanism of claim 10, wherein the eight sensors comprise two hall sensors and three accelerometers mounted on the rotor blade and one hall sensor and two accelerometers mounted on the APL mechanism.

13. The feedback control system of claim 12, wherein the rotor blade is one of a plurality of blades coupled to a rotor hub of a helicopter.

14. The feedback control system of claim 12, wherein the rotor blade is one of a plurality of blades coupled to a rotor hub of a wind turbine.

15. The feedback control system of claim 1, wherein the flow control mechanism is an active twist rotor (ATR) mechanism.

* * * * *